US008373120B2

(12) United States Patent
Verentchikov

(10) Patent No.: US 8,373,120 B2
(45) Date of Patent: Feb. 12, 2013

(54) METHOD AND APPARATUS FOR ION MANIPULATION USING MESH IN A RADIO FREQUENCY FIELD

(75) Inventor: Anatoli N. Verentchikov, St. Petersburg (RU)

(73) Assignee: LECO Corporation, Saint Joseph, MI (US)

( * ) Notice: Subject to any disclaimer, the term of this patent is extended or adjusted under 35 U.S.C. 154(b) by 29 days.

(21) Appl. No.: 13/056,167

(22) PCT Filed: Jul. 28, 2008

(86) PCT No.: PCT/US2008/071349
§ 371 (c)(1),
(2), (4) Date: Apr. 26, 2011

(87) PCT Pub. No.: WO2010/014077
PCT Pub. Date: Feb. 4, 2010

(65) Prior Publication Data
US 2011/0192969 A1 Aug. 11, 2011

(51) Int. Cl.
*H01J 49/26* (2006.01)
*B01D 59/44* (2006.01)

(52) U.S. Cl. ........ 250/290; 250/281; 250/282; 250/284; 250/286; 250/291

(58) Field of Classification Search .................. 250/281, 250/282, 284, 286, 288, 291, 292
See application file for complete search history.

(56) References Cited

U.S. PATENT DOCUMENTS 2,939,952 A 6/1960 Paul et al.
4,963,736 A 10/1990 Douglas et al.
5,179,278 A 1/1993 Douglas
(Continued)

FOREIGN PATENT DOCUMENTS

EP 1267387 12/2002
EP 1271608 1/2003
(Continued)

OTHER PUBLICATIONS

United States Patent Publication No. 2003/0136905, Jul. 24, 2003, Franzen et al.

(Continued)

*Primary Examiner* — David A Vanore
(74) *Attorney, Agent, or Firm* — Honigman Miller Schwartz and Cohn LLP; Thomas J. Appledorn; Jonathan P. O'Brien

(57) ABSTRACT

Ion manipulation systems include ion repulsion by an RF field penetrating through a mesh. Another comprises trapping ions in a symmetric RF field around a mesh. The system uses macroscopic parts, or readily available fine meshes, or miniaturized devices made by MEMS, or flexible PCB methods. One application is ion transfer from gaseous ion sources with focusing at intermediate and elevated gas pressures. Another application is the formation of pulsed ion packets for TOF MS within trap array. Such trapping is preferably accompanied by pulsed switching of RF field and by gas pulses, preferably formed by pulsed vapor desorption. Ion guidance, ion flow manipulation, trapping, preparation of pulsed ion packets, confining ions during fragmentation or exposure to ion to particle reactions and for mass separation are disclosed. Ion chromatography employs an ion passage within a gas flow and through a set of multiple traps with a mass dependent well depth.

38 Claims, 15 Drawing Sheets

U.S. PATENT DOCUMENTS

| | | | | |
|---|---|---|---|---|
| 5,420,425 | A | 5/1995 | Bier et al. | |
| 5,572,035 | A | 11/1996 | Franzen | |
| 5,763,878 | A | 6/1998 | Franzen | |
| 5,818,055 | A | 10/1998 | Franzen | |
| 5,847,385 | A | 12/1998 | Thomson et al. | |
| 6,011,259 | A | 1/2000 | Whitehouse et al. | |
| 6,020,586 | A | 2/2000 | Dresch et al. | |
| 6,093,929 | A | 7/2000 | Javahery et al. | |
| 6,111,250 | A | 8/2000 | Thomson et al. | |
| 6,140,638 | A | 10/2000 | Tanner et al. | |
| 6,177,668 | B1 | 1/2001 | Hager | |
| 6,507,019 | B2 | 1/2003 | Chernushevich et al. | |
| 6,627,875 | B2 | 9/2003 | Afeyan et al. | |
| 6,693,276 | B2 | 2/2004 | Weiss et al. | |
| 6,727,495 | B2 * | 4/2004 | Li | 250/286 |
| 6,870,158 | B1 | 3/2005 | Blain | |
| 6,872,941 | B1 | 3/2005 | Whitehouse et al. | |
| 6,949,735 | B1 | 9/2005 | Hatakeyama et al. | |
| 7,060,987 | B2 * | 6/2006 | Lee et al. | 250/423 R |
| 7,189,967 | B1 | 3/2007 | Whitehouse et al. | |
| 7,309,861 | B2 * | 12/2007 | Brown et al. | 250/290 |
| 7,365,317 | B2 * | 4/2008 | Whitehouse et al. | 250/292 |
| 7,615,743 | B2 * | 11/2009 | Baykut et al. | 250/282 |
| 7,888,635 | B2 * | 2/2011 | Belov et al. | 250/283 |
| 8,013,290 | B2 * | 9/2011 | Rather et al. | 250/281 |
| 8,013,296 | B2 * | 9/2011 | Wollnik et al. | 250/288 |
| 2009/0134321 | A1 * | 5/2009 | Hoyes | 250/282 |
| 2009/0173880 | A1 * | 7/2009 | Bateman et al. | 250/292 |
| 2010/0276591 | A1 * | 11/2010 | Finlay | 250/292 |
| 2011/0192969 | A1 * | 8/2011 | Verentchikov | 250/282 |
| 2011/0220790 | A1 * | 9/2011 | Sun et al. | 250/288 |
| 2011/0248160 | A1 * | 10/2011 | Belov | 250/283 |

FOREIGN PATENT DOCUMENTS

| | | |
|---|---|---|
| EP | 1271611 | 1/2003 |
| GB | 2372877 | 9/2002 |
| GB | 2388248 | 11/2003 |
| GB | 2403590 | 1/2005 |
| GB | 2403845 | 1/2005 |
| WO | 02078046 | 10/2002 |
| WO | 2004021385 | 3/2004 |
| WO | 2007136373 | 11/2007 |

OTHER PUBLICATIONS

P.H. Dawson and N.R. Whetten, *Mass Spectroscopy Using RF Quadropole Fields*, in: Advances in electronics and electron physics, V. 27, Academic Press. NY, 1969, pp. 59-185.

Badman, Ethan R. et. al., "A Parallel Miniature Cylindrical Ion Trap Array," *Anal. Chem*. V.72 (2000) 3291-3297.

Taylor et. al., Silicon Based Quadrupole Mass Spectrometry Using Micromechanical Systems, J. Vac. Sci. Technology, B, V19, 62 (2001) pp. 557-562.

Senko, Michael W. et.al., "External Accumulation of Ions for Enhanced Electrospray Ionization Pourier Transform Ion Cyclotron Resonance Mass Spectrometry," JASMS, vol. 8 (1997) pp. 970-976.

McLuckey, Scott A., et al., "Ion Parking during Ion/Ion Reactions in Electrodynamic Ion Traps," *Anal. Chem*. vol. 74 (2002) pp. 336-346.

Dehmelt H.G., "Radiofrequency Spectroscopy of Stored Ions," Adv. Mol. Phys. V.3 (1967) 53.

Teloy, E. et al., "Integral Cross Sections for Ion-Molecule Reactions. 1 The Guided Beam Technique," Chemical Physics, vol. 4 (1974) pp. 417-427.

Gerlich D. and Kaefer G., Ap. J. vol. 347, (1989) pp. 849-854.

LD, Landau and EM. Lifshitz in *Theoretical Physics*, vol. 1, Pergamon, Oxford, (1960) p. 93.

Luca, Alfonz et al., "On the combination of a linear field free trap with a time-of-flight mass spectrometer," *Review of Scientific Instruments*, vol. 72, No. 7, Jul. 2001.

Londry, F.A. et al., "Mass Selective Axial Ion Ejection from a Linear Quadrupole Ion Trap," *Am. Soc. For Mass. Spectrom*., 2003.

* cited by examiner

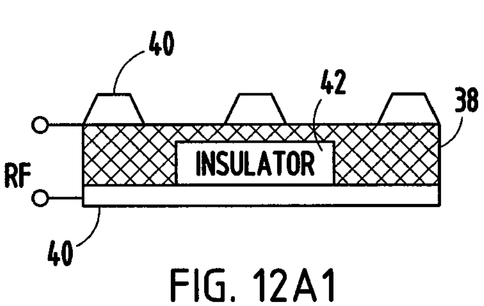
FIG. 12A1
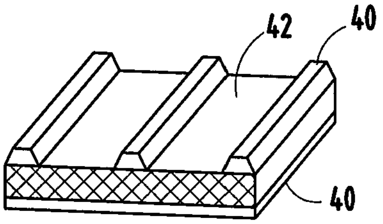
FIG. 12A2
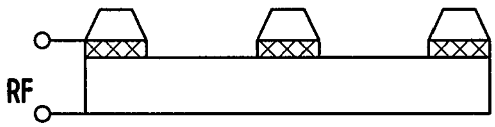
FIG. 12B1
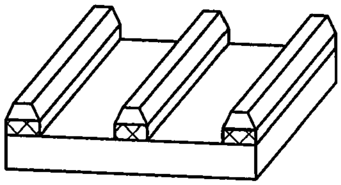
FIG. 12B2
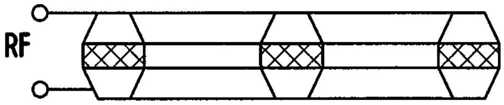
FIG. 12C1
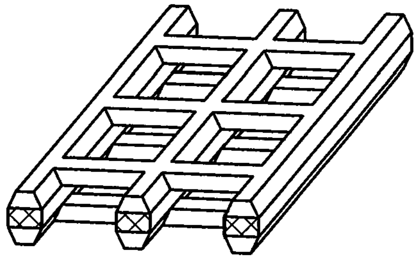
FIG. 12C2

METHOD AND APPARATUS FOR ION MANIPULATION USING MESH IN A RADIO FREQUENCY FIELD

BACKGROUND OF THE INVENTION

This invention relates to the field of ion optics and mass spectrometry and, more particularly, radio frequency (RF) devices and methods for ion transfer, storage and preparation of ion packets for mass analysis.

Mass spectrometry employs a variety of radio frequency (RF) devices for ion manipulation. The first distinct group comprises RF mass analyzers.

Radio frequency (RF) quadrupole ion filters and Paul ion trap mass spectrometers (ITMS) have been well known since the 1960's. Both mass analyzers are suggested in U.S. Pat. No. 2,939,952. A detailed description of one example can be found in P. H. Dawson and N. R. Whetten, in: Advances in electronics and electron physics, V. 27, Academic Press. NY, 1969, pp. 59-185. More recently linear ion traps emerged with radial (see U.S. Pat. No. 5,420,425) and an axial (see U.S. Pat. No. 6,177,668) ion ejection. All ion trap mass spectrometers employ nearly ideal quadratic potential (achieved with hyperbolic surfaces) and are filled with helium at an intermediate gas pressure. Ions are trapped by an RF field, dampened in gas collisions and are sequentially ejected, e.g. while ramping amplitude of the RF field. Ion traps employ many elaborate strategies to perform ion isolation and fragmentation which (in combination with resonant ejection) allow a so-called tandem mass spectrometer (MS-MS) analysis.

In the late 1990's there appeared a trend of miniaturizing 3-D ion trap and quadrupole mass spectrometers to form parallel batches by methods of micromachining (see U.S. Pat. No. 6,870,158; Badman et. al., A Parallel Miniature Cylindrical Ion Trap Array, Anal. Chem. V. 72 (2000) 3291; and Taylor et. al, Silicon Based Quadrupole Mass Spectrometry using micromechanical systems, J. Vac. Sci. Technology, B, V19, #2 (2001) p. 557).

The second distinct group of mass spectrometric RF devices comprises ion guides. Mostly those devices are based on 2-D quadrupole or multipole, extended along one dimension and usually referred as linear. Linear ion guides are mostly used for ion transfer from gaseous ion sources to mass spectrometers like quadrupole. Gaseous collisions relax ion kinetic energy and allow spatial confining of ions to the guide (see U.S. Pat. No. 4,963,736). Gaseous linear multipoles are also employed for ion confining in fragmentation cells of tandem MS, like triple quadrupoles and Q-TOF (see U.S. Pat. No. 6,093,929). An axial DC field formed, for example, by external auxiliary electrodes, is used to accelerate ion transfer within a guide (see U.S. Pat. No. 5,847,386) or within a fragmentation cell (see U.S. Pat. No. 6,111,250).

Linear ion guides could be plugged by axial DC fields to form a linear ion trap. Multipole linear ion traps are widely used for ion accumulation and pulsed ion injection into a 3-D ITMS (see U.S. Pat. No. 5,179,278), a FT ICR (see S. Senko et. al., JASMS, v. 8 (1997) pp. 970-976), an orbitrap (see WO02078046 A2 by Thermo) and a into time-of-flight mass spectrometer (TOF MS), directly (see U.S. Pat. No. 5,763, 878 by Franzen) or via an orthogonal accelerator (see U.S. Pat. No. 6,020,586 by Dresch et al.; U.S. Pat. No. 6,507,019 by Sciex; and Great Britain patent GB2388248 by Micromass). Ion guides and ion traps are also employed for exposing ions to ion molecular reactions with neutrals (see U.S. Pat. No. 6,140,638 and U.S. Pat. No. 6,011,259 by Analytica), with electrons (see British patents GB2372877, GB2403845 and GB2403590), ions of opposite polarity (see S. A. McLuckey, G. E. Reid, and J. M. Wells, Ion Parking during Ion/Ion Reactions in Electrodynamic Ion Traps, Anal. Chem. v. 74 (2002) 336-346, and U.S. Pat. No. 6,627,875 by Afeyan et al.) and photons (see Dehmelt H. G., Radio frequency Spectroscopy of Stored Ions, Adv. Mol. Phys. V. 3 (1967) 53).

A majority of mass spectrometric ion guides and linear storing ion traps devices employ a topology of quadrupole and multipole RF fields. Referring to FIGS. 1A-1D, such multipoles are composed of rods with alternated RF phase. A quadrupole ion guide (FIG. 1A) is formed by two pairs of parallel rods with an RF voltage being applied between the sets. To make a distinction, one phase is denoted as +RF, while an opposite phase of RF signal is denoted −RF. Similarly, an octupole (FIG. 1B) and a higher order multipole (FIG. 1C) are formed of two interleaved sets of rods. Multipole rods are aligned on a cylindrical surface. To eliminate a net field on axis (denoted as RF=0) usually those sets are fed by two equal RF signals of the opposite phase. In the extreme case of very high order multipole the curvature of the inscribed circle becomes negligible and a portion of such multipole looks more like a plane formed by rods with alternating RF signals (FIG. 1D).

Looking at multipoles in a more general sense, one can treat the rod structure as a set of dipoles (FIG. 1D), each formed by pairs of neighbor rods. In the case of multipoles, those RF dipoles are aligned within a circular surface. Each dipole has a very short penetration range, much shorter compared to individual rods. Even at moderate spacing between dipoles their fields become independent and allow a flexible arranging of dipoles.

Referring to FIGS. 2A-2D, enclosed RF surfaces have been used for ion trapping and ion guidance. In E. Teloy and D. Gerlich, "Integral Cross Sections for Ion Molecular Reactions. 1 The Guided Beam Technique", Chemical Physics, V. 4 (1974) 417-427, an ion source is formed using horse shoe electrodes with alternating RF signals (FIG. 2A). RF dipoles repel ions from the walls. The top and the bottom sides are plugged by DC caps. The central core of the source is almost field-free, which is convenient for ionizing by electrons and for ion relaxation in gas collisions. Referring to FIG. 2B, a so-called RF channel is formed between two planes of linear RF dipoles formed of parallel wires with alternated RF signals (see European Patent No. EP1267387 by Park). DC plugs are used on the sides of the channel.

A ring ion guide (see FIG. 2C) (see Gerlich D. and Kaefer G., Ap. J. v. 347, (1989) 849 and U.S. Pat. No. 5,572,035 to Franzen) is another example of an enclosed RF surface with a short range ion repulsion near the walls and a field-free core. For ion propulsion, a moving wave is formed by applying several RF signals with a distributed phase shift (see U.S. Pat. No. 5,818,055 and U.S. Pat. No. 6,693,276 by Weiss et al.), or a wave of DC signals is superimposed on the top of alternating RF signals (see European Patent No. EP1271608 and EP1271611 by Micromass in 2002].

Operation of various ion guides is based on the ion repelling action by inhomogeneous RF fields. The effect has been analyzed by LD. Landau and E M. Lifshitz in *Theoretical Physics*, Vol. 1, Pergamon, Oxford, (1960) p. 93, as well as by H. G. Dehmelt in "Advances in Atomic and Molecular Physics", ed. D. R. Bates, Vol. 3, Academic Press, New York, (1967) pp. 53-72. Ion motion is composed of fast oscillations within an RF field and a slow motion in a mean, time-averaged force of an RF field. When there is sufficient frequency, the ion oscillations become minor compared to the geometric scale of the RF field homogeneity. The mean effect of such RF oscillations being averaged over the cycle of the RF field is equivalent to a net force that is directed towards a region with smaller amplitude of RF field. Such force is considered as a gradient of so-called dynamic potential. A slow (average) ion motion can be then approximated by ion motion within a total (effective) potential V* being a sum of dynamic D and electrostatic potentials Φ:

$$V^*(r)=D(r)+\Phi(r)=zeE(r)^2/4m\omega^2+\Phi(r) \quad (1)$$

Where ze and m are the charge and mass of ions, ω is the circular frequency of the RF field, and E(r) is the strength of the local RF field. The first term of the equation ties dynamic potential D to a local strength of the RF field E: $D \sim E^2$, i.e. D increases near sharp edges and zeroes on axis of symmetric RF devices. In other words, the RF field repels ions from areas with strong RF field into areas with a smaller field, usually occurring on the axis of symmetric devices.

The above cited paper (Teloy et. al, 1974) describes a generic recipe of forming ion guides and traps: " . . . which show absolute minima of V* (total effective potential in Equation 1) in two or three dimensions of space and therefore are able to guide or to trap ions. For instance, ion traps can be constructed, in which a nearly field-free volume is enclosed by steep repulsive walls of the effective potential. Such a wall can be formed by an arrangement of equally spaced parallel rods, which are concerned alternately to RF voltages of opposite phase, or similarly by metal plates or wires."

U.S. Pat. No. 5,572,035 to Franzen recognizes that an RF dipole surface can serve as an independent construction unit (see FIGS. 3A-3D) for repelling ions of both polarities. Particular RF surfaces are formed of two interleaved planar arrays of electrodes (see FIGS. 3B and 3C), such as wire tips in both arrays or a honeycomb mesh in combination with an array of penetrating tips (see FIG. 3A). Such surfaces are composed of RF dipoles and they are characterized by strong, but very short-ranged, ion repulsion. Franzen suggests guiding ions above the dipolar RF surface or between two dipolar RF surfaces. There is also suggested an ion guide with a different topology RF surface formed by a pair of interleaved helixes (see FIG. 3D).

U.S. Pat. No. 6,872,941 to Whitehouse et. al. suggests ion confining between an RF dipolar surface and a DC field for guiding ions, trapping ions and for pulsing ions into a TOF MS. Whitehouse et al. allows forming a narrow ribbon of ions, reducing phase space of the beam and accommodating a large number of ions without space charge effects. To eject ions into a TOF MS, the RF signals are switched to voltage pulses (see FIG. 4A). Alternatively, ions are thrown onto an RF surface for surface-induced dissociation prior to injection into TOF MS.

WO2004021385 suggests using a planar RF dipolar surface for ion manipulation between individual open traps near the surface. Ions are trapped by applying an attracting DC voltage and a short range repelling RF voltage to a spot or a thin line electrode (FIG. 4B). It is assumed that the surrounding plane is grounded, i.e. RF spots or lines are alternated by ground planes or strips. The field structure is formed by RF and DC dipoles formed by alternating electrodes. The device is configured to create an array of manipulating cells for ion trapping, conveying, focusing and separating by mass. The method is well compatible with PCB technologies, micromachining, and the small geometrical scale of ion manipulating devices. Unfortunately, opposing RF and DC dipoles substantially limit the mass range of trapped ions.

Summarizing, RF devices are widely used in mass spectrometry for mass analysis and for ion guidance and trapping. A majority of devices have a shape of a 3-D trap or multipole rods. Recently suggested devices employ planar RF surfaces. All the devices are believed to be formed of alternating electrodes aligned on a surface (planar or cylindrical) to form a chain of dipoles. This requires building a structure of alternating electrodes, which complicates fabrication of RF devices and becomes an obstacle to miniaturization and fabrication of massive arrays.

SUMMARY OF THE INVENTION

The inventor has discovered a better technological way of making ion repelling RF surfaces. A radio frequency (RF) surface can be formed by a single mesh electrode within an RF field or bounding an RF field. Concentration of the RF field on the entire mesh surface (i.e. on both sides) repels ions from the surfaces. Contrary to prior art, the present invention does not require forming a system of alternating electrodes and their alignment within a single surface. The mesh electrode can be formed by a woven or electrolytic mesh, parallel wires, or a sheet with multiple holes (perforated electrode). Such an electrode could be bent or wound and is structurally convenient for building a variety of ion guides and ion traps and can be readily built at a much smaller scale.

The RF field can be formed by applying an RF signal between the mesh and at least one surrounding electrode (see FIG. 5). The system tolerates a voltage-asymmetric RF feeding, wherein an RF signal is applied to only one electrode. Since the mesh repels ions an attracting DC potential could be applied to a mesh.

The inventor further discovered that there are two distinct geometrical topologies of RF field around the mesh. In the first case of substantially asymmetric topology, the RF field is mostly concentrated on one side of the mesh when an RF signal is applied between an electrode and a mesh. The RF field would repel ions out of the intraelectrode region with a strong RF field and push ions beyond the mesh. Though the RF field penetrates through the mesh openings and the majority of electric field lines are closed on the 'shadow' side of the mesh, the strength of electric field is sufficient to protect all the surfaces against ion deposition. The fringing RF field in the outer region of the mesh appears an ion repelling surface and while being closed into loop or combined with other forces (DC or RF) it could be used for guiding or trapping ions, particularly suited for ion transfer interfaces.

In the second case of symmetric topology, the RF field is substantially symmetric on both sides of mesh surface. As an example, an RF signal is applied to mesh, which is placed between two plates. Then local RF traps (2 or 3-D depending on mesh structure) are formed within cells of the mesh. Since mesh surface repels ions, an attracting potential could be applied to the mesh and the traps within mesh cells become global. Such an array of ion traps is particularly suited for ion packet preparation in time-of-flight mass spectrometry.

The two different RF fields differ by their action on ions. The mesh within a strongly asymmetric RF field (ultimately fringing field) forms a wall which repels ions above one side of the mesh. The mesh within substantially symmetric field forms ion traps within the closed cells of the mesh. If using parallel wires, there is formed an array of ion guides. By varying symmetry of the field, one may manipulate ions, trap them or make them move between cells.

The inventor further discovered that a novel format of isolated mesh is readily compatible with miniaturization of radio frequency devices. There are readily available electrolytic or woven meshes with wire diameter of 10-30 microns which is at least 2 orders of magnitude smaller compared to rod diameters in conventional ion guides. Even more, a readily available technology of micromachining (MEMS)

could be used to fabricate a finer mesh with wire size in a micron scale. Technologies like photo-etching, laser cutting and MEMS could be used to construct a system of parallel perforated electrodes while shrinking electrode sizes from millimeters to microns, i.e. providing a scaling factor S up to 1000.

Miniaturization itself helps to form compact ion sources forming ion clouds with an extremely small phase space. Smaller RF traps provide a much tighter ion beam confinement which provides a smaller phase space of ion beam. Such traps could be used for example to form short ion packets for time-of-flight mass spectrometers.

Miniaturization is necessarily related with proportional raise of RF frequency, i.e. micron scale (compared to mm scale of regular rods in ion guides) would require a GHz frequency range (compared to MHz frequencies in ion guides). A higher frequency would extend an operable gas pressure range S times, i.e. from fraction of millibars to a fraction of atmosphere and ultimately reaching atmospheric pressure. Thus RF focusing could be used in a variety of atmospheric and gaseous ion sources for mass spectrometry and optical spectroscopy. RF focusing can be employed to focus ions in the region of intermediate gas pressure past gaseous sources, for example in the nozzle region or in the region between the nozzle and skimmer. The challenge is to form mechanically stable and cleanable RF systems.

The inventor also discovered a technological way of making an RF repelling surface by forming a sandwich with insulating or partially insulating materials. An example comprises a sandwich formed by mesh laying on insulating (or semi-insulating) surface which is attached to a metal substrate. The RF signal being applied between mesh and metal substrate forms an RF field around the mesh. Such surface repels ions and is unlikely to be charged. Still, very energetic particles or ions out of confined m/z range could hit the insulator. However, a sufficiently high field may assist surface discharge or charge migration towards the mesh. Alternative methods are suggested to make sandwiches with insulating bridges hidden under mesh wire or between two mesh wires, for example, made by cutting windows in a readily available sandwich.

Miniaturized traps have sufficient space charge capacity. Individual cells are isolated from each other by the walls of the RF electrode. At first glance, the number of cells per square centimeter is proportional to the square of scaling factor $S^2$, while the ion volume per cell is proportional to cube of characteristic cell size R, $R^3 \sim S^{-3}$ and total number of ions is ~1/S. On the other hand, once there is one ion per cell the space charge effect disappears. At 10 um scale, there is $10^6$ cells per square centimeter, i.e., about 1 million ions could be stored without inducing space charge effects on each other, since they are separated by mesh wires. I.e. miniaturization allows reaching a level when less than one ion is stored per cell, surrounded by shielding electrodes and thus eliminating space charge effects.

Miniaturization allows forming a massive array of ion traps. The invention suggests a novel way of mass separation, which is defined in this application as ion chromatography. Gas flow is used to pass ions between multiple ion traps, operating sequentially. The RF barrier between traps is dependent on ion mass-to-charge ratio. As a result a collection of ions will be separated by the time of ion passage through the ion chromatograph, similarly to retention time in conventional chromatography. Ion differentiation by mass could be assisted by DC field, DC moving field or AC excitation of ion secular motion. Relative inaccuracy of making individual small cell leads to a very moderate mass resolving power per cell. At 10 um size and 0.3 um accuracy resolving power per cell is expected to be below 10. However, sequential pass of multiple cells is expected to improve resolving power proportional to the square root of cell number. The 10 cm chip holding 10000 traps (filters) would provide 1000 resolving power, sufficient for example for environmental applications. Similarly to gas chromatography where a gradient is formed by varying temperature, in ion chromatography a ‘gradient’ can be formed by varying RF and DC voltages, AC signals, temperature or parameters of the gas flow.

Various combinations of the above described novel features are particularly useful in making efficient pulsed ion converters for time-of-flight mass spectrometer. Preferably, a wire mesh between plates would form a planar array of miniature RF ion guides. Ions will be confined within linear cells of the mesh by gaseous dampening. The guide protrudes through several stages of differential pumping. Due to gas flow and due to cell space charge, ions would be moving toward the extraction region at vacuum conditions.

To extract ions at the vacuum side of the pulsed converter, the RF signal is switched off and extracting electric pulses are applied. Preferably the RF signal is applied to central mesh while pulses are applied to surrounding electrodes, wherein one electrode has exit aperture or an array of exit apertures, or an exit mesh. Preferably, the RF generator is switched off in synchronous relationship with the phase of the RF signal. Preferably, the RF field is turned off for some time prior to applying an extracting field. For example, the RF generator could be switched off within a few cycles of RF by breaking contact in the center of the secondary coil. Apparently ions expansion in a decaying RF filed causes ions adiabatic cooling very much similar to ions free expansion. Such a delay increases spatial spread but causes a correlation between spatial position and ion velocity, which could be used in a further time-of-flight focusing.

The small size of the array ion guide would allow raising gas pressure in the guide without additional gas scattering of ejected ions. A higher gas pressure allows a faster ion dampening and allows a high repetition rate in pulsed ion converters. A higher pulsing rate reduces requirements on dynamic range of TOF. Miniaturization of the mesh helps in tight spatial confinement of ions with cloud size proportional to cell size. A large number of cells prevents space charge effects and eliminates space charge heating and swelling of ion cloud. A small size phase volume of ions (as a product of temporal and spatial spreads) could be transferred into a small spreads in time and energy of ion packets which, in turn, is expected to improve resolution of TOF MS.

These and other features, advantages, and objects of the present invention will be further understood and appreciated by those skilled in the art by reference to the following specification, claims, and appended drawings.

BRIEF DESCRIPTION OF THE DRAWINGS

FIG. 12A is a schematic diagram which shows an RF sandwich with (semi-) insulating layer;

FIG. 12B is a schematic diagram which shows an RF sandwich with (semi-) insulating bridges;

FIG. 12C is a schematic diagram which shows an RF sandwich with aligned meshes (cuts in three layer sandwich);

DETAILED DESCRIPTION OF THE PREFERRED EMBODIMENTS

RF Repelling Surface

Figure 1A:
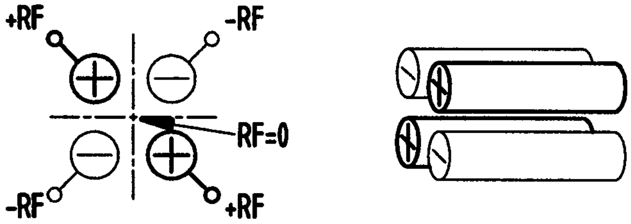
FIG. 1A (PRIOR ART)
FIG. 1A is a schematic diagram which shows a prior art quadrupole rod set.
Figure 1B:
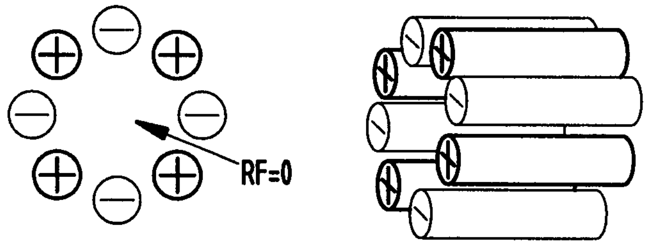
FIG. 1B (PRIOR ART)
FIG. 1B is a schematic diagram which shows a prior art octupole rod set.
Figure 1C:
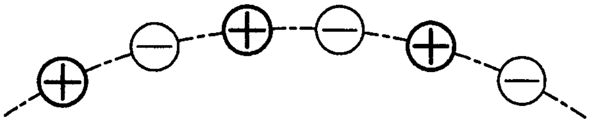
FIG. 1C (PRIOR ART)
FIG. 1C is a schematic diagram which shows a section of a prior art high order multipole rod set.
Figure 1D:
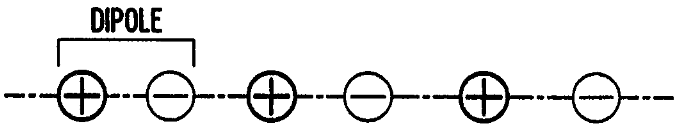
FIG. 1D (PRIOR ART)
FIG. 1D is a schematic diagram which shows an extreme case of infinitive order multipole converting into a chain of RF dipoles.
Figure 2A:
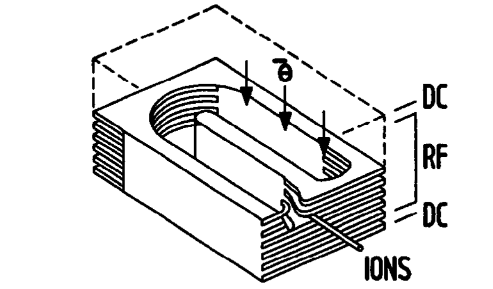
FIG. 2A (PRIOR ART)
FIG. 2A is a schematic diagram which shows a prior art RF channel with DC caps for an ion source.
Figure 2B:
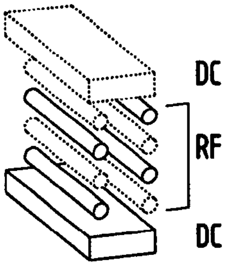
FIG. 2B (PRIOR ART)
FIG. 2B is a schematic diagram which shows a prior art RF channel with DC caps for an ion guide.
Figure 2C:
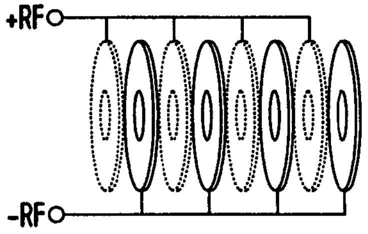
FIG. 2C (PRIOR ART)
FIG. 2C is a schematic diagram which shows a prior art ring ion guide with alternated RF coupling.
Figure 2D:
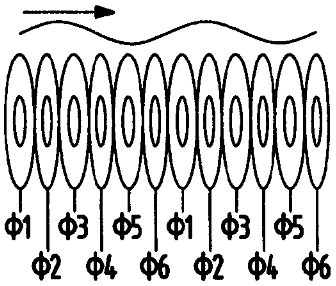
FIG. 2D (PRIOR ART)
FIG. 2D is a schematic diagram which shows a prior art ring ion guide with a moving wave RF (DC)
Figure 3A:
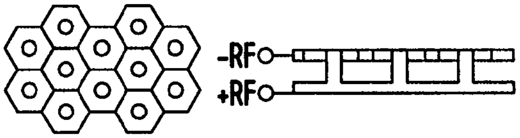
FIG. 3A (PRIOR ART)
FIG. 3A is a schematic diagram which shows a prior art dipolar RF surface formed by alternated mesh and tips.
Figure 3B:
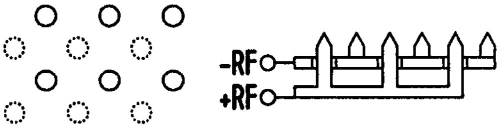
FIG. 3B (PRIOR ART)
FIG. 3B is a schematic diagram which shows a prior art dipolar RF surface formed of wire tips.
Figure 3C:
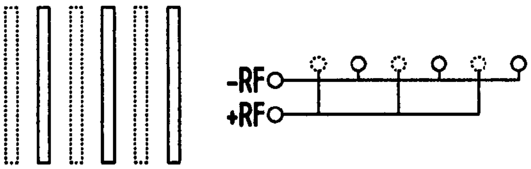
FIG. 3C (PRIOR ART)
FIG. 3C is a schematic diagram which shows a prior art dipolar RF surface formed of parallel wires.
Figure 3D:
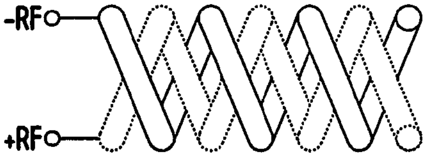
FIG. 3D (PRIOR ART)
FIG. 3D is a schematic diagram which shows a prior art ion guide formed by pair of interleaved helixes.
Figure 4A:
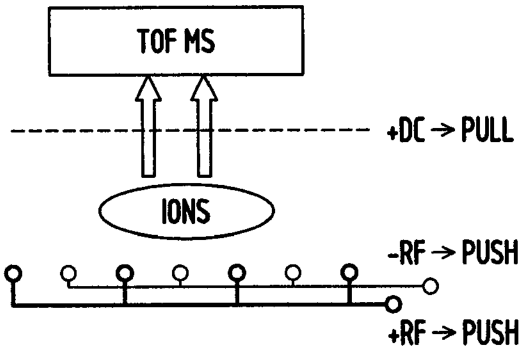
FIG. 4A (PRIOR ART)
FIG. 4A is a schematic diagram which shows a prior art ion source for TOF MS formed of RF surface and DC mesh.
Figure 4B:
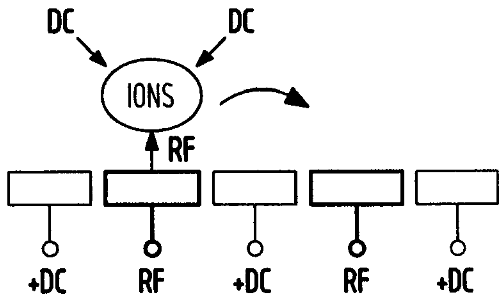
FIG. 4B (PRIOR ART)
FIG. 4B is a schematic diagram which shows a prior art ion manipulator near a surface formed of RF and DC dipoles.
Figure 5A:
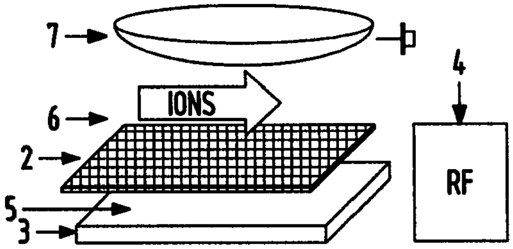
FIG. 5A shows a preferred embodiment of ion repelling surface of the present invention formed by an RF field penetrating through a mesh.
Figure 5B:
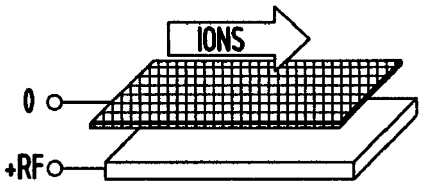
FIG. 5B shows an example of voltage asymmetric RF feeding with ground mesh.
Figure 5C:
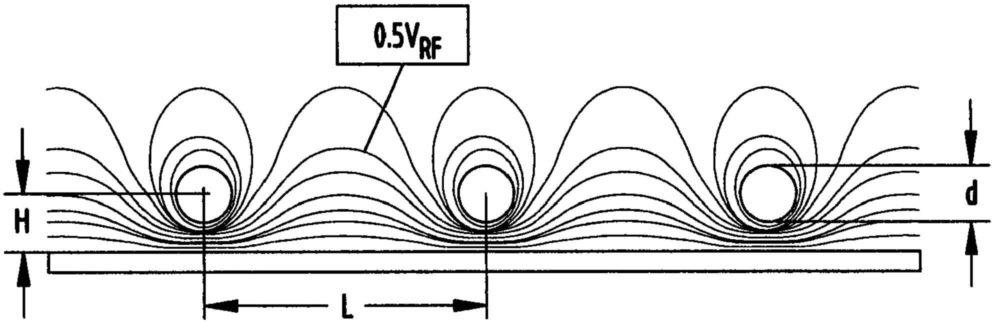
FIG. 5C is a field diagram which shows equipotential lines of momentarily RF field near ground mesh.

Referring to FIG. 5A, the ion repelling system 1 of the present invention using an asymmetric RF field comprises a mesh 2 and a plate 3 and an RF signal generator 4 connected between the mesh and the plate. The system forms an inner region 5 between the electrodes 2 and 3 and an outer region 6 behind the mesh. A grounded outer electrode 7 (representing vacuum chamber) is spaced in an outer region from mesh 2, and the distance between the electrode 2 and the curved electrode 7 far exceeds the cell size of the mesh 2. The RF potential could be applied asymmetric, either to mesh 2 or plate 3 (FIGS. 5B and 5C). Alternatively, RF signals of opposite phases (denoted as +RF and −RF) could be applied to both electrodes (FIG. 5D) and their amplitude could be adjusted to minimize RF field in the outer region 6.

Referring to FIG. 5C, an RF field around the mesh is shown for a particular example of two-dimensional mesh (i.e. formed by parallel wires) with wire diameter d being ⅕ of wire spacing L and distance between wire plane and electrode plane H equal to wire diameter d: d=0.2 L and H=0.2 L (the geometry used to maximize RF repulsion in 2-D case). The outer grounded electrode 7 is assumed at a distance much greater than L, which is modeled by setting field symmetry conditions at a plane sitting at distance S=3 L. The RF field of amplitude $V_{RF}$ is applied to the back plate 3, while the mesh 2 is grounded. The RF field is visualized by showing equipotential lines at a moment when potential of the plate reaches maximum $U=V_{RF}$. Looking at equipotential lines one can see that the field penetrates through mesh openings. The equipotential line with $U=0.5V_{RF}$ penetrates into a mesh opening at about the upper surface of the mesh. Grounded mesh wires spatially alternate with fringing field. To examine RF field in the outer space the penetrating equipotential line could be replaced by an electrode with the same potential. The penetrating line with $U=0.5V_{RF}$ is equivalent to a penetrating electrode with alternated potential, with the exception that now it does not require building an accurately aligned arrays of electrodes with alternating potentials. In other words, a fringing RF field (i.e. penetrating through a mesh) creates similar dipolar field structure by much simpler means. A penetrating field causes a net potential at far distance, in this particular case equal to $0.3V_{RF}$, i.e. only 70% of the voltage is utilized to form dipoles.

Figure 5D:
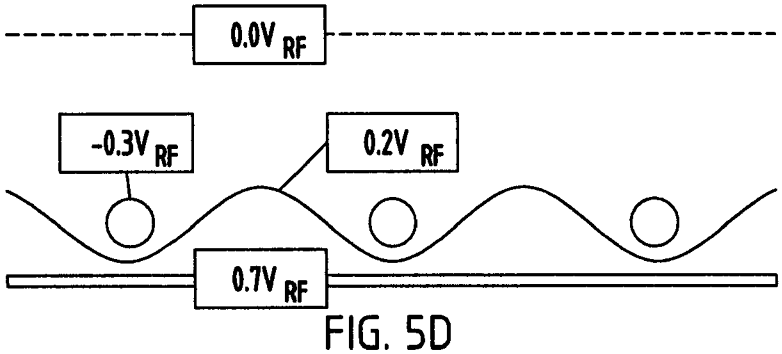
FIG. 5D is a field diagram which shows equipotential lines in an example of compensating RF feeding eliminating RF field far beyond the mesh.

Referring to FIG. 5D the net RF field above the mesh in the outer space 6 could be compensated or balanced by distributing RF signal between mesh and electrode. In this geometrical example to compensate outer RF field one has to apply two RF signals of opposite phases and to adjust amplitudes as: $0.3V_{RF}$ to the mesh 2 and $0.7V_{RF}$ to the plate 3. To emphasize phase difference in the drawing the mesh voltage is shown as $-0.3V_{RF}$. Note, that the balancing of external field could be achieved at equal amplitudes of RF signals by adjusting electrode shape (for example, d=0.12 L and H=0.2 L). Even if external RF field is not fully compensated the RF field in the outer region is weak and much more homogeneous than near the mesh. As a result gradient of dynamic potential is negligible compared to one near the mesh and RF induced forces should be considered only in the mesh vicinity.

Figure 6A:
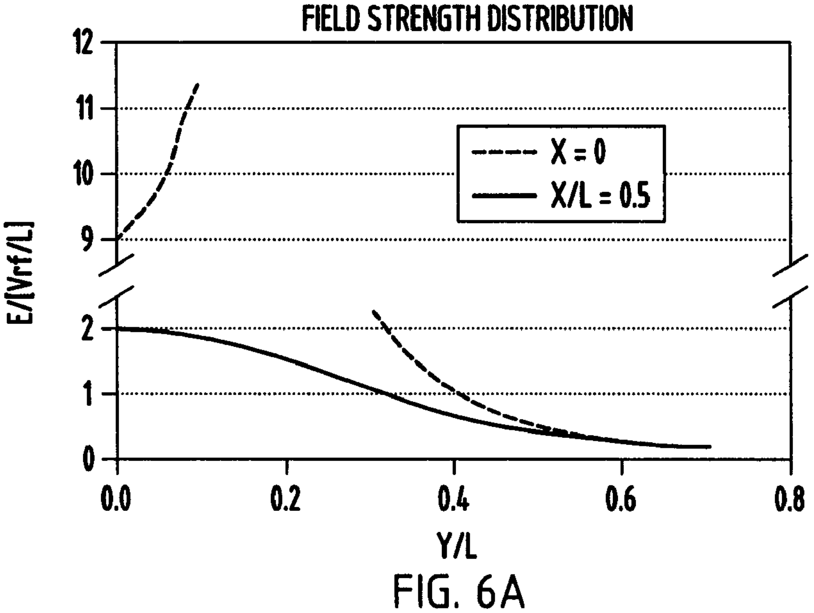
FIG. 6A is a plot of normalized strength of RF field penetrating through a mesh—$E/[V_{RF}/L]$ Vs (Y/L)

Ion repulsion is characterized by simulating a distribution of local electric field strength E in the same electrode system ($V_{RF}$ potential is applied to plate 3, while mesh 2 with spacing L and outer electrode 7 are ground). FIG. 6A shows a normalized distribution $E/[V_{RF}/L]$ as a function of (Y/L) for the plane corresponding to wire center (X=0 and dashed line) and in the middle between wires (X/L=0.5 and solid line). It is immediately seen that the field E in the outer region is much weaker compared to inner region. The aforementioned equation (1) directly links the strength of local electric field E to a height of dynamic potential D as $D \sim E^2$. Thus, the dynamic potential is lower in the outer region, the gradient of dynamic potential is directed outwards which causes ion repulsion above the mesh plane.

Figure 6B:
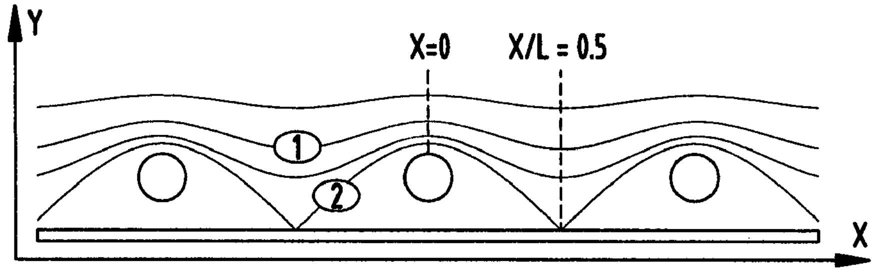
FIG. 6B is a diagram which shows the two-dimensional equilines of local strength of RF electric field.

Referring to FIG. 6B, the two-dimensional equilines of local electric field (E-equilines) are shown for the same electrode system. The lines correspond to 'tidal line' of ion penetration into the RF field at a given ion energy. The fringing RF field creates a wall of dynamic potential which retards ions. Note that the geometry (d=0.2 L and H=0.2 L) provides the strongest normalized field $E/[V_{RF}/L]=2$ in both weakest points—near mesh surface and near back plate.

A comparison is made with a conventional RF repelling system having parallel wires with alternating potentials $+V_{RF}$ and $-V_{RF}$. The latter optimizes at d=0.44 L when the electric field strength is equal on the wire top and in the middle between the wires. The field strength then reaches $E=1.53V_{RF}/L$, where $V_{RF}$ is the amplitude of signal between wires (i.e. peak to peak voltage). Note, that in the system of the present invention with a fringing RF field, the strength of the electric field is higher and reaches $E=2V_{RF}/L$, which can be explained by the appearance of 'effective' intermediate electrodes and formation of a twice as dense dipole structure.

To compare efficiency of ion repulsion each system has to be examined at individually optimized RF frequency. The optimum frequency should be low enough to maximize the height of dynamic barrier while still providing stable micromotion for lowest m/z ions. However, if a non-optimum frequency is chosen, then the maximum barrier is just reached at a different m/z. The frequency factor could be excluded if normalizing ion m/z either to a cut off mass or some other characteristic mass.

Figure 7:
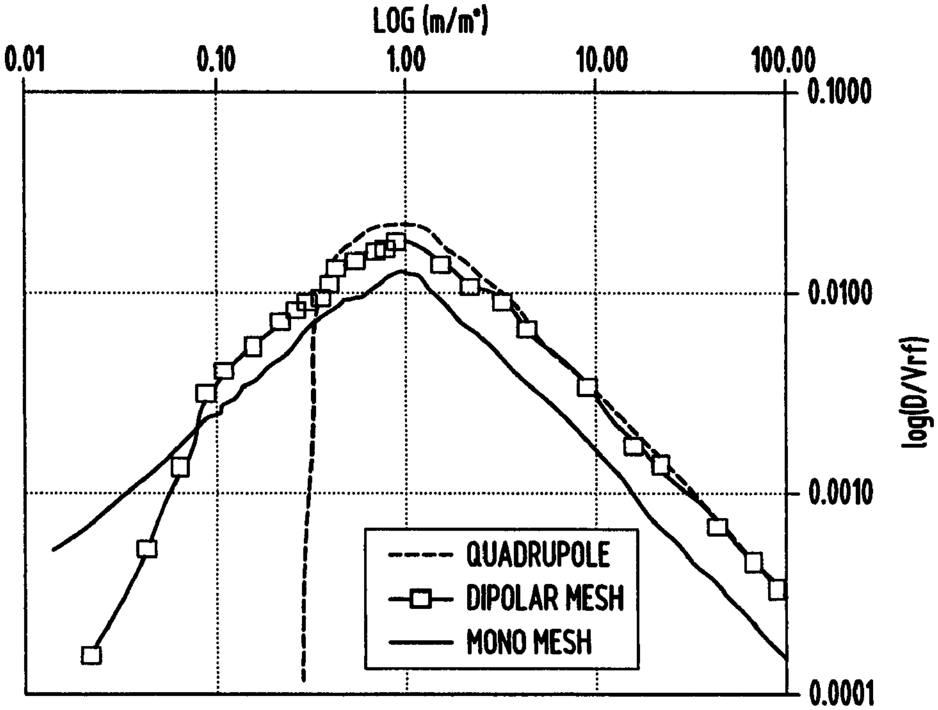
FIG. 7 is a bi-logarithmic plot for normalized height of dynamic potential Vs normalized ion mass to charge ratio for quadrupole (dashed line) for dipolar RF surface (dashed line with squares) and for the novel RF surface (solid line)
Figure 8A:
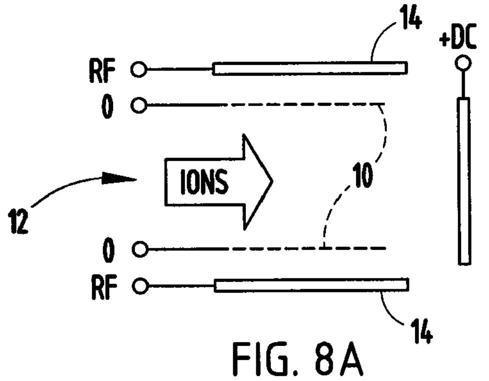
FIG. 8A is a schematic diagram which shows an ion channel formed of two novel RF surfaces.
Figure 8B:
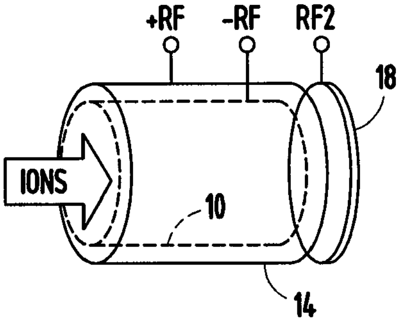
FIG. 8B is a schematic diagram which shows an ion channel formed by wrapping a novel RF surface into arbitrary cylinder.
Figure 8C:
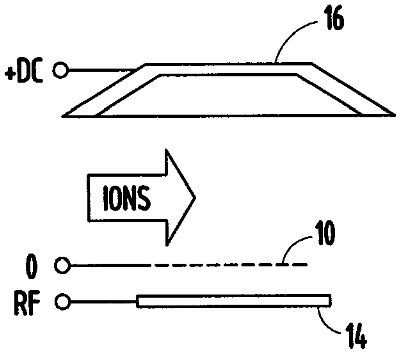
FIG. 8C is a schematic diagram which shows a channel formed by a novel RF surface and external repelling DC electrode.
Figure 8D:
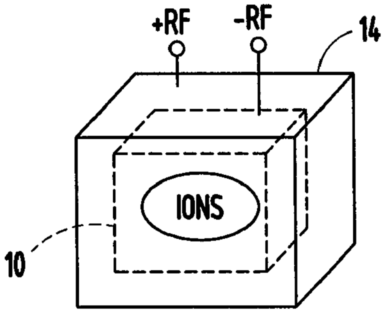
FIG. 8D is a schematic diagram which shows an ion trap formed by wrapping a novel RF surface into an arbitrary box.

FIG. 7 is a bi-logarithmic plot of a normalized height of dynamic potential $D/V_{RF}$ as a function of ion m/z. To align curves the ion mass is normalized to a mass corresponding to individual curve maximum m*. The dotted curve corresponds to quadrupole, the dashed line with white squares—to a dipolar plane with alternated wires and the solid line—to the system of this invention—2-D mesh with fringing field. The height of dynamic potential D is defined in ion optics simulations as a maximum ion energy ϵ per charge at which all the ions are still repelled regardless of hit location, angle or RF phase: D=max(ϵ). Particles start from a field-free zone and impinge onto the region with strong RF field. The potential D is normalized onto peak-to-peak RF voltage—$_{RF}$. To make a fair comparison both the mesh and the back plate of the novel system with fringing field are fed by RF signals of opposite phase and of the same amplitude. Such normalization is not needed for calculating $D/V_{RF}$, but is needed to find the effect of geometry on mass m*.

Referring to FIG. 7, only the quadrupole is characterized by a clear cut off at low mass caused by ion instability, which is known to occur at q~0.909. The barrier reaches maximum $D/V_{RF} \sim 0.025$ (corresponding to 25V barrier at 1000Vp-p) at q=0.3, which is known to correspond to a maximum q for adiabatic motion.

Comparable barrier height in quadrupole is expected from equation 1:

$$D=(V_{RF}/8)*q*(r/R)^2 \quad (2)$$

$$\text{for } q=4ezV_{RF}/(mR^2\omega^2) \quad (3)$$

Indeed, $D=0.025V_{RF}$ at q=0.3 if assuming that external boundary of slow secular motion is reached at r=0.8R and some space is required for RF motion. At any higher q (q>0.3) the particle impinge too fast and experience very few RF cycles, so that eq. 1 fails describing the barrier. As expected from eq. 2, at a higher mass (lower q) the barrier appears proportional to q, which is confirmed in FIG. 7—in bi-logarithmic plot D(m/z) becomes a straight line with the slope=−1.

Other systems are far from being harmonic and equations 2 and 3 are not applicable there. However, they exhibit very similar behavior in the adiabatic region, i.e. at m>m* and near the maximum m~m*. The difference appears in the low mass region, i.e. at m<m*. Systems with a highly inhomogeneous field do not exhibit clear cut off at low mass. There is just weaker ion repulsion, i.e. system can hold low energy ions of a much wider mass range. To estimate the mass range in gas filled ion guides, it can be assumed that a barrier D=1V is sufficient for ion retention, i.e. $D/V_{RF}$~0.001 at 1000V p-p. Then quadrupole provides two decades of transmitted mass range (FIG. 7), while both dipolar and monopolar RF surfaces provide already 3 decades of mass range, which is explained by inhomogeneous structure of the RF field near thin wires. Such an ion guide would be suitable e.g. for MALDI sources generating ions in a wide mass range (say from 100 to 100, 000 amu).

It is also seen in FIG. 7 that maximum value D for the RF surface with fringing field is about half compared to quadrupole and about 1.4 times lower than D for dipolar surface. This fact can be understood since the penetrating equipotential in the novel system corresponds to 70% of $V_{RF}$ (FIG. 5C). Once accounting for this 30% field shielding by the mesh, the fringing RF field provides the same ion repulsion as bipolar RF surface. In spite of somewhat lower D at the maximum point the system still allows capturing and transferring ions in a wide mass range, estimated as 3 decades.

To account for differences in mass range, a geometric scale G characteristic is associated with each electrode system. For reference, the inscribed radius R as a characteristic scale in a quadrupole set: To find G for other systems, it is assumed that maximum of $D/V_{RF}$ curve is achieved at the same adiabatic parameter q=0.3. Based on the above simulations, the characteristic geometric scales are equal:

G=R (i.e. ~¼ of spacing between rod centers) for quadrupole

G=0.3 L for RF mesh with cell size L, wire diameter d=0.2 L and spacing to plate H=0.2 L;

G=0.55 L for dipolar RF wires with spacing L and wire diameter d=0.4 L;

Similarly to quadrupole system the optimum frequency F can be now derived from Eq.3 using scale λ instead of R and noting that maximum barrier D is reached at m=m* and q=0.3:

$$F^2=a\cdot zeV_{RF}/(m^*G^2)$$

$$\text{Where } a=4/[0.3^*(2\pi)^2]\sim 2.12. \qquad (4)$$

The equation (4) predicts that an optimum frequency has to be adjusted in reverse proportion to the geometrical scale of all RF devices.

Devices Using RF Surface

Referring to FIG. 8, the RF repelling surface could be used for ion trapping and ion guidance. The RF repelling surface can be combined with another RF surface or with a DC field. As an example, a pair of RF repelling surfaces formed by mesh 10 and surrounding electrodes 14 would create an ion channel 12 (FIG. 8A). Wrapping a single RF surface into a cylinder thus creates a cylindrical ion guide (FIG. 8B). An attracting DC potential could be applied to either mesh 10 or back electrode 14, or both to create a channel with a minimum of total potential, which could be used to guide ions (FIG. 8C). The figures show an equivalent repelling DC potential on the counter-electrode 16. It is assumed by default that any type of ion guide could be converted into a linear ion trap by plugging ions axially, either by DC electrodes 16 (FIGS. 8A and 8C), or by RF repelling surfaces 10 and 14, or by RF electrode 18 (FIG. 8B). Wrapping the RF repelling surface into an arbitrary shaped box 14 (e.g., sphere or parallelepiped) also forms an ion trap, as seen in FIG. 8D.

Figure 9A:
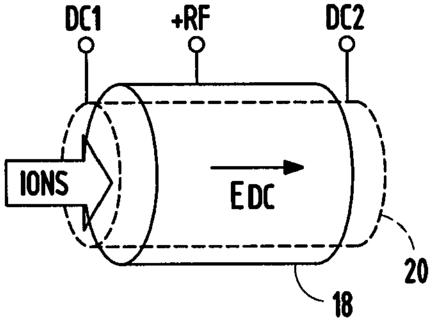
FIG. 9A is a schematic diagram which shows an ion guide with an axial DC field formed by electric current through one of electrodes.
Figure 9B:
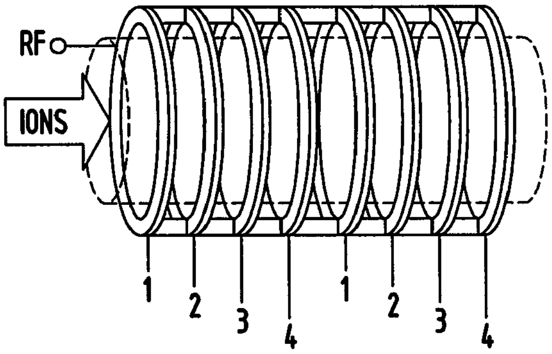
FIG. 9B is a schematic diagram which shows an ion guide with an axial propagating moving wave of electric field.
Figure 10A:
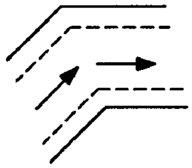
FIGS. 10A-10L are schematic diagrams depicting plumbing schemes using novel ion guides.
Figure 10B:
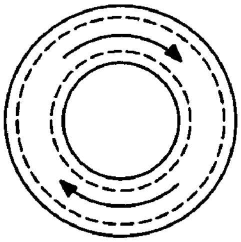
Figure 10C:
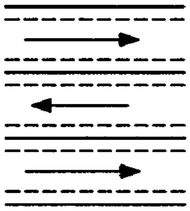
Figure 10D:
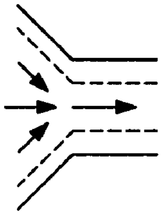
Figure 10E:
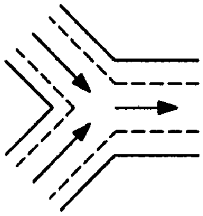
Figure 10F:
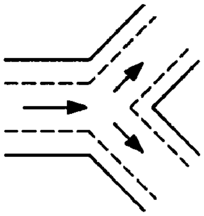
Figure 10G:
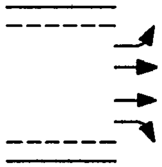
Figure 10H:
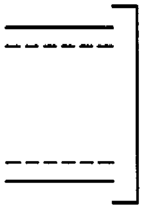
Figure 10I:
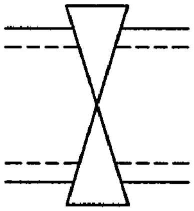
Figure 10J:
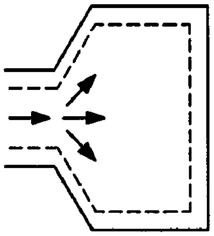
Figure 10K:
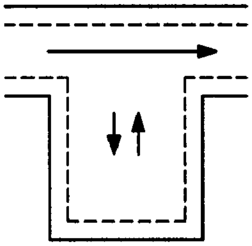
Figure 10L:
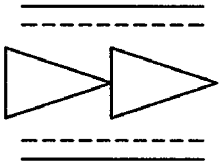

Since RF and DC supplies could be separated, e.g. RF supply is connected to only one electrode 18, another electrode could have a finite conductivity and can be used to create a DC gradient. Referring to FIG. 9A, an example of ion guide is given, wherein RF supply is connected only to external electrode 18 and an axial DC gradient is arranged by passing a current through the inner mesh 20. Such current could be continuous or pulsed to drive ions in the preferred direction, usually in axial direction. Obviously, application of RF and DC voltages can be reversed. The RF is then applied to central mesh 23, while DC gradient is arranged externally and partially penetrates through the mesh. An external DC field can be converted into a moving wave DC field (applied at phases 1, 2, 3, 4), penetrating trough the mesh into the core of ion guide, as seen in FIG. 9B. A moving wave is known to precisely control ion transfer time or, if adjusted to a higher speed, is capable of inducing ion fragmentation in energetic collisions with gas molecules.

The ion guide can be used to pass ions in vacuum. Ions would stay confined as long as the ion energy is below the effective dynamic potential. However, adding a gas is beneficial in multiple cases. Damping of ion motion will reduce ion kinetic energy and stabilize ions by lowering internal energy (possibly excited at ion formation or ion transport). For a majority of the below discussed applications, the ion guide is assumed operated at an intermediate gas pressure between 1 mtorr and 10 Torr.

The ion guide made of mesh is characterized by a very low (practically negligible) field in the middle and by a steep field near the wall. In a sense the guide acts more like a pipe. Referring to the schematics of FIGS. 10A-10L, multiple plumbing solutions could be implemented, comprising: bending (A) and looping (B) ion flows, arranging parallel channels for co-flows and counter-flows (C); confining ion flows in a smooth or stepped funnel (D), merging (E) and splitting (F) ion flows; making a free drain (G), capping (H) or valve switching (I) ion flows, building ion reservoirs (J), pulse dampers (K) and pumps (L). One can integrate those elementary pipe devices into more dedicated apparatuses. Some particular applications are descried later in the text.

The RF field in the middle of the RF channel is almost negligible, particularly in the core of enclosed RF channels. At vacuum conditions ions would travel because of their initial energy. However, ion contact with RF repelling surface is likely to scatter the ion. The motion of injected ion beam would be similar to gas diffusion through a channel. In case of gas ion motion would be dampened and ions would be again diffusing. To control the ion net motion (also oscillations, or trapping) within the channel there is needed an additional driving force, particularly in the presence of a damping gas. Multiple methods are suggested, comprising the above described method of DC potential gradient (similarly to pipe pressure), a gas flow within an outer electrode, a moving wave electrostatic field through a mesh (similarly to peristaltic pumps), a moving wave DC field, penetrating through the mesh, an intentionally made gradient or a rotor of RF field penetrating through a mesh into the open channel (e.g. formed by making irregular mesh structure) or formed by applying RF signals of a different frequency to separate parts of the inner mesh. Since the electric field is negligible in the middle of the channel, a static transverse magnetic field would serve as a plug. The plug could be switched on and off to modulate ion flow in time. Similarly a moving magnetic front would induce an ion flow.

All the above driving methods could be used to control an axial motion through a guide, to plug one end of the pipe for the purpose of ion storage, to concentrate ion flow by plugging and releasing, to induce ion oscillations heating ions in gas collisions or promoting ion reactions, to excite ions to the level of controlled fragmentation and ultimately for inducing electric discharge and ionization of vapors.

The RF ion guide acts equally on particles of both polarities and thus can hold or guide them simultaneously, e.g. for ion-ion or ion-electron reactions. In spite of RF field penetration through the mesh, the symmetric (e.g. coaxial) guide would have a field free core. Such inner core could be used to pass slow electrons, which would otherwise be unstable in the RF field. The electrons could be used for ionization by electron impact, for charge recombination, or electron capture dissociation.

The described ion guide bound by mesh with penetrating (fringing) RF field is applicable to a wide variety of mass spectrometric devices operating in gaseous conditions and in vacuum. The list includes:

- ion sources with internal ionization (like PI, EI, CI, APCI), where the RF surface serves for trapping of reacting charged particles (e.g. electrons and reagent ions for ionization) and is used to confine and cool product ions;
- ion sources with an external ionization and a storage device for preparing pulsed ion packets for introduction into mass spectrometer, e.g. TOF MS, axially or via an orthogonal accelerator;
- ion guides for ion transport, confining, focusing, storing, and ion excitation;
- mergers and splitters of ion flow, used for example to combine multiple sources on a single mass spectrometer;
- ion traps for ion accumulation and manipulation;
- fragmentation cells, including gas collisional induced (CID) and surface induced (SID) dissociation, cells for electron capture dissociation (ECD) and ion capture dissociation (ICD);
- ion reactors, cells for reducing charge of multiply charged ions; and
- hybrid devices, combining multiple above devices; an example is the ion guide for slow ion transfer and periodic pulsing ions orthogonally into TOF MS described below.

Macroscopic RF Surfaces

The application of the mesh RF repelling surface is promoted by easy and robust manufacturing and also by ready availability of much smaller geometrical scale (sub-millimeter) compared to conventional macroscopic ion guides made of rods in centimeter and millimeter scales.

Referring to FIG. 11, the mechanical design of macroscopic RF surfaces is considered. A macroscopic mesh can be made of multiple electrodes, such as a set of connected rings 22 (FIG. 11A), a perforated thin wall tube 24 (FIG. 11B), and helix wire 26 supported by welded bars 28 (FIG. 11C). Such devices could be made with sub-millimeter wires, which reduce the geometrical scale.

Figure 11A:
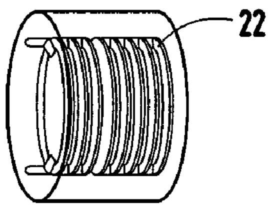
FIG. 11A is a schematic diagram which shows an example of ion guide formed using a macroscopic mesh.
Figure 11B:
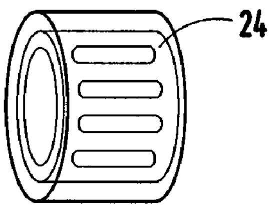
FIG. 11B is a schematic diagram which shows an example of ion guide formed using perforated cylinder.
Figure 11C:
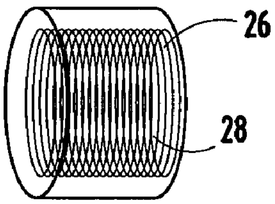
FIG. 11C is a schematic diagram which shows an example of ion guide formed using coaxial rings or helixes.
Figure 11D:
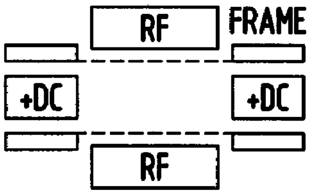
FIGS. 11D-11E are schematic diagrams which show mesh electrodes mounted to frame electrodes.
Figure 11E:
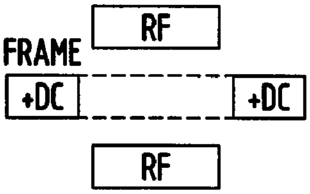

Even finer cell structures could be made using electrolytic and woven meshes. There are electrolytic meshes available with various cell shapes (e.g. square, elongated rectangular, hexagonal). Fine meshes with 50-100 LPI (0.25-0.5 mm cell size) and wire thickness from 10 to 30 um are manageable for mechanical assembly. The most straightforward way of aligning a mesh to a back electrode would be stretching the mesh on a planar frame. Multiple ways of attaching the mesh are available, e.g. using coaxial rims, spot welding, soldering or gluing stretched mesh to frame electrodes. Such technologies would be mostly compatible with planar geometries, as shown in FIGS. 11D and 11E. To terminate edges between RF surfaces, one can use DC repelling electrodes.

Figure 11F:
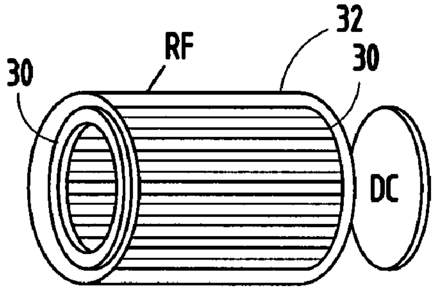
FIGS. 11F-11G is a schematic diagram which shows a mesh electrode coupled to a circular frame.
Figure 11G:
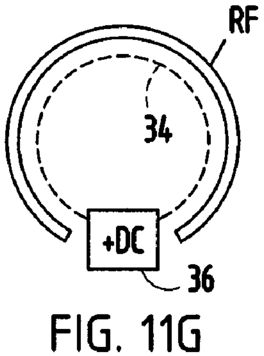

Another example of stretched mesh is a set of wires spot welded to circular frames 30, as shown in FIG. 11F. Such a squirrel barrel makes a cylindrical mesh. The mesh is placed inside a coaxial outer electrode 32 and an RF signal is applied between them. The system does not repel ions near the frame, which should be considered in ion optics design, either introducing ions far from the mount frames or repelling ions by DC plugs near edges. FIG. 11G presents a design with bent mesh 34. To improve geometric precision, such a mesh possibly could be formed by electrolytic methods. The mesh is attached to DC plug 36 on one side to repel ions from the technological edge. Positioning of the mesh against the back electrode is a limiting factor in miniaturizing RF surfaces. A smaller scale device would require yet a different approach.

Microscopic RF Surfaces

Referring to FIGS. 12A1-12A2, an RF sandwich assembly is shown for an ion repelling surface, comprising a mesh 38, a sheet electrode 40, and an insulating or semi-insulating thin film 42 between them. The RF signal is applied between the mesh and the sheet. Such a sandwich provides mechanical support for the mesh and controls the spacing between conductive electrodes. As a result, the sandwich structure allows a much finer miniaturization of the ion repelling surface with features reaching a micron scale.

There are multiple ways of making such system. In one particular embodiment, the mesh lies on (or is attached to) the insulating sheet 42 (or semi-insulating sheet). The RF field penetrates through the insulator and allows forming an ion repelling surface. In some favorable conditions, the RF field may assist charge removal from the surface. A limited conductance of a semi-insulator would also protect the surface from electrostatic charging. Most importantly, the insulator provides a mechanical support for the mesh. The solid insulator prevents electrical breakdown between electrodes. Such design could withstand cleaning without damaging the mesh and clogging mesh cells.

Referring to FIGS. 12B1-12B2, a microscopic RF sandwich is made by an alternative method, wherein insulator islands are hidden behind the mesh wire. For example, chemical modification of one side of mesh surface could make this side insulating. Alternatively, a readily existing sandwich of two bonded films (one conductive and one insulating) is perforated (e.g. by laser) and then placed onto a substrate electrode. The insulator could be used for spacing between electrodes and ideally for bonding mesh to substrate electrode. Yet alternatively the metal substrate with readily attached layers of insulator and metal on top is subjected to scratching, etching, etc. to cut groves all the way to the metal substrate.

Referring to FIGS. 12C1-12C2, a microscopic RF sandwich is made using a pair of aligned meshes with insulating islands between them. As an example, the readily existing sandwich formed by 3 sheet layers is perforated to form a single sandwich mesh. Alternatively, a readily existing semi-insulating mesh is either modified on the surface to be non-conductive or metal coatings are deposited (e.g. by metal spattering at sliding angle) on both sides.

The above structures and methods of manufacturing are also applicable in intermediate geometrical scales to planar PCB and to flexible film PCB.

Methods of micromachining (MEMS) could be used to create fine structures, mostly planar. The curved sandwich mesh could be formed by condensation of micro particles and using electrolytic methods in combination with MEMS methods.

Small scale of RF meshes is compatible with forming arrays of parallel devices. For example multiple parallel ion guides would reduce the effects of space charge and allow storage of large number of ions. However, in the majority of suggested devices only cell size and the distance to back plate are microscopic. It does not prohibit arranging macroscopic open channels or traps with bore size in mm and cm scales.

Extended Gas Pressure Range

The above described methods of making ion guides are likely to generate truly microscopic sandwich meshes with features in a micron scale. According to equation 4, the frequency should be reverse proportional to geometrical scale. To hold ions in the mass range of 100 to 10000 amu, the frequency of RF signal should be raised in F=100 MHz-1 GHz range. It becomes difficult sustaining the same voltage since power of generator rises with frequency as: $W\sim CV_{RF}^2F/Q$, where C is electrode capacity and Q is quality factor of resonant circuit. Relaxing voltage by a factor of 10 (say to 100 V) would reduce the power and lower the frequency F as well. Miniaturization should be done with minimizing capacitance (in general direct proportional to geometrical scale). The total capacitance could be brought below 10 pF by eliminating connecting cables and holding RF resonant circuit in close vicinity of the electrodes. If resonant circuit quality is about Q~100 then consumed power is only $10^{11}*10^4*10^9/10^2=1$ W at 1 GHz frequency. A 1 kV signal is not realistic since it would cause 100 W dissipation in a small volume. Note, that RF voltage is also limited below 200 V by electric discharge at lower size or higher pressures.

A higher frequency would allow extending gas pressure range of the RF focusing, which occurs while ion motion bears inertial features, i.e. when collisional relaxation time τ is longer than period of the RF field, which could be expressed as:

$$\omega\tau>1 \qquad (5)$$

To link RF frequency $F=\omega/2\pi$ to a limit of operable gas pressure P one should consider that relaxation time is calculated as average time between ion to gas collisions multiplied by efficiency of momentum exchange: $\tau=(\lambda/a)\cdot(m/m_g)$. Considering $\lambda=1/n\sigma$ and $P=nkT$ resulting in:

$$P<P_{max}=F\cdot[2\pi\cdot kTm/m_g a\sigma] \qquad (6)$$

where mg is the mass of a gas molecule, λ, a, n, and T are mean free molecular path, sonic velocity, specific concentration and temperature of the gas, σ is the ionic cross section, k—is the Boltzman constant.

The result suggests that the range of operable gas pressure $P_{max}$ expands proportionally to RF frequency ω, which accompanies reducing spatial scale of RF surface. The formula (6) also shows that the pressure range expands for larger particles proportional to their m/σ. By raising frequency from MHz to GHz range the pressure range expands from a sub torr range to a sub atmospheric range. Such devices could be used for ion RF focusing and confinement in ion transport interfaces between atmospheric ion sources and mass spectrometers and ultimately to assist RF focusing of large ions and particles (like charged micro-droplets) at atmospheric conditions.

Analysis of eq. 6 is presented in Table 1 below. The mass corresponding to maximum of ion transmission is selected around m*=1000, to ensure capturing of mass range from 100 to 10000 amu. According to FIG. 7, the barrier stays above $0.002V_{RF}$, i.e. above 0.4V at $V_{RF}>200$ V. Power is calculated assuming quality factor Q=100. The cross section of ions is assumed $\sigma=10^{-18}$ m$^2$.

TABLE 1

Optimum frequency F and upper gas pressure $P_{max}$ Vs geometrical scale.

| between wires L, (mm) | Scale G (mm) | $V_{RF}$ (p-p) (V) | Frequency, F (MHz) | Power (Watt) | $P_{max}$ (Torr) |
|---|---|---|---|---|---|
| 10 | 3 | 4000 | 4 | 6.4 | 3 |
| 1 | 0.3 | 1000 | 20 | 2 | 15 |
| 0.1 | 0.03 | 200 | 100 | 0.7 | 75 |
| 0.01 | 0.003 | 200 | 1000 | 7 | 750 |

Gaseous Ion Interfaces

Figure 13A:
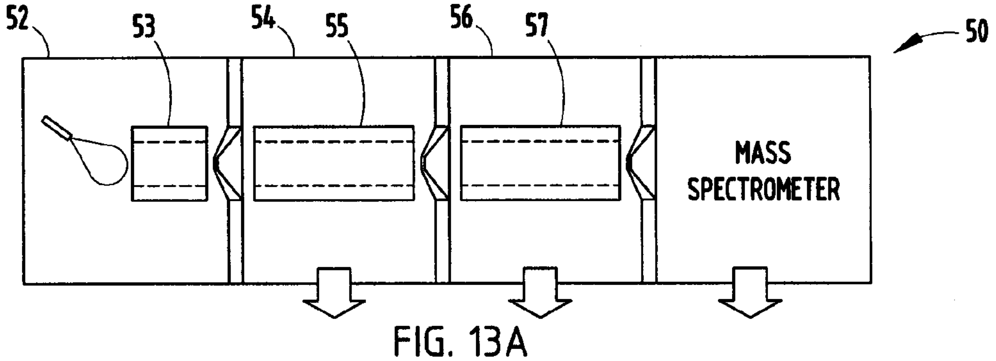
FIG. 13A is a schematic diagram which shows ion transfer interface employing additional RF focusing at elevated gas pressures.

Referring to FIG. 13A, the preferred embodiment of a gaseous ion interface 50 comprises multiple differentially pumped stages, connecting gaseous ion source 52 to a mass spectrometer. The particular example in FIG. 13A shows an ESI ion source in atmospheric region 52, a region 54 behind a nozzle and a region 56 behind the skimmer Stages are separated by apertures and differentially pumped, wherein pumps are shown by arrows. The preferred embodiment further comprises ion guides in various stages, including an atmospheric ion guide 53, an intermediate ion guide 55 behind the nozzle and an ion guide 57 behind the skimmer.

Each ion guide of this embodiment comprises a channel with RF repelling surfaces. The RF surfaces comprise an inner mesh, a surrounding electrode and an RF supply connected between the mesh and the electrode as shown earlier in FIG. 8*b*, FIGS. 9A-9B, and FIGS. 11A-11G. Optionally, an insulator or semi-insulator is inserted between the mesh and the electrode as in FIG. 12. Preferably, the channel is either cylindrical or substantially planar and made using any aforementioned method of microscopic machining (MEMS), PCB technology in planar guide, flexible PCB—in cylindrical guide.

The preferred embodiment of FIG. 13A in fact suggests using additional RF ion guides within a conventional ion transport interface. In typical ESI source a sample solution is atomized into a charged aerosol and ions are formed at a late stage of aerosol evaporation. Total spray current is in the range of 100-500 nA. Mostly because of space charge effects the ESI aerosol spreads in the source and ions are extracted from evaporating droplets in the region of about 1 cm size. Ions are sampled through the nozzle, being substantially frozen into a dense gas flow (i.e. ion flow follows gas flow and expands as the gas flow). The sampled current is proportional to gas flux through the nozzle. Typical gas pressure behind the nozzle is about 1 Torr, which limits the gas flux (mass flow) through the nozzle to 10 Torr*L/s (at a reasonable pumping speed of a fore-vacuum pump below 10 L/s). Low gas flux limits the nozzle diameter below 0.5 mm and reduces efficiency of ion sampling through the nozzle below 1% of the total spray current. The gas jet expands behind the nozzle and less than 10% of the flux is sampled through the next aperture—skimmer. Normally, the efficiency of ion sampling is somewhat better than gas split ratio and ion loss factor between the nozzle and the skimmer varies from 3 to 5. Multipole RF ion guides are typically used behind the skimmer in order to eliminate further ion losses. The gas pressure in the guide is around 10 mtorr. At such pressures, a conventional multipole ion guide with mm size of rods is capable of ion focusing while using RF signal of about 100 to 1000 V amplitude and 1 to 5 MHz frequency.

The present invention suggests a realistic way of miniaturizing RF electrodes in ion guides to micron scale, which in turn allows operating at unusually high frequencies in the range of 100 Mhz-1 GHz and, as a consequence, at unusually high gas pressure range in sub atmospheric range. For heavy ions and for charged aerosol, the RF focusing by the guide 53 should be attainable at atmospheric pressure. The microscopic ion guide 55 is suggested for an additional ion focusing at an intermediate gas pressures. Ion guide 57 at lower gas pressure could be either microscopic or macroscopic.

The atmospheric ion guide 53 is suggested to prevent expansion of aerosol (normally induced by self space charge). Preferably, the guide 53 is made by MEMS of PCB film methods as shown in FIGS. 12A-12C. Those sandwich guides are particularly suitable in the source region, because of longevity issues. The surface of ion guide should be cleanable after deposition of charged droplets. The guide may be in the form of a channel confining aerosol. Alternatively, the guide may form a trap which passes ions through but holds charged aerosol for complete evaporation. Aerosol flow should be assisted by gas flow. Such RF surface with microscopic features is used to form a channel or a trap with a bore of a few mm to confine the aerosol without affecting the spray. The same microscopic RF surface could be also used to cover nozzle walls to improve transmission and to avoid clogging.

The intermediate ion guide 55 behind the nozzle eliminates ion losses normally caused by the gas jet expansion. Preferably, the guide is cylindrical to confine ion flow within a bore of several millimeters in order to improve the subsequent ion sampling into the skimmer. In conventional interfaces the guide should operate at gas pressure range of several Torr. At such pressures the RF voltage is limited by gas discharge to about 200 V. To sustain RF focusing the RF frequency is expected to be in 30-100 MHz range and the scale mesh features is below 0.1 mm. Such ion guide is preferably made of fine mesh as shown in FIGS. 11A-11G.

The ion guide 57 behind the skimmer is an optional replacement for conventional ion guide, operating at 1-100 mtorr gas pressure range. It can be made at macroscopic scale (millimeters) of RF surface and operate in MHz range of RF frequency. However, for convenience and for higher sensitivity the guide 57 could be also made as an extension of the guide 55.

Figure 13B:
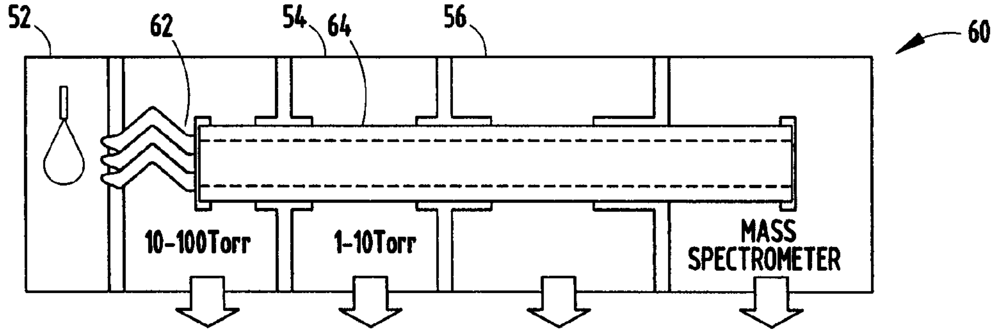
FIG. 13B is a schematic diagram which shows ion transfer interface with an increased gas flux through an array nozzle and an ion guide protruding through multiple stages of differential pumping.

Referring to FIG. 13B, another embodiment the ion interface 60 comprises additional pumping stages, a multi-channel nozzle 62, and a single ion guide 64 protruding through walls. Transmission of the interface 60 is improved by raising gas flux through the nozzle by 10 to 100 fold. In FIG. 13B, elements common to FIG. 13A employ the same reference numbers and share their description. This will drastically improve ion sampling through the nozzle even without RF focusing at atmosphere (note, that the atmospheric ion guide 53 of FIG. 13A is removed). Preferably, an array of parallel nozzles 62 is used to avoid condensation in the jet at a higher total gas flow. Aperture of each individual nozzle stays in the safe range from 0.3 to 1 mm. It is also preferable to introduce a flow bent or an obstacle in the flow path to spin off large particles and droplets as in impact separators. Multiple flows are then merged into a single channel. Higher gas flow leads to a higher gas pressure behind the nozzle around 10-100 Torr. Mechanical pumps can sustain their pumping speed in this pressure range. Despite the high gas pressure, the novel microscopic RF focusing device 60 confines an ion flow right behind the nozzle and transfers it to the mass spectrometer. The channel of the ion guide 60 is several mm wide to accommodate the entire ion flow. The guide walls are formed using an RF surface of the invention, comprising a microscopic mesh with a back RF electrode. The guide protrudes through walls of a differentially pumped system. In each stage, the outer wall of the guide has windows for pumping which are covered by fine mesh.

The number of pumping stages is optimized based on available pumping means. Presently turbo pumps operate at gas pressure below 10-20 mtorr and at higher gas pressures one should use alternative pumps like mechanical, scroll and drag pumps. Preferably, at least one more stage of mechanical pumping is used with gas pressure is between 1 to 10 Torr before using turbo pumps. Number of mechanically pumped stages could be optimized based on transmission and economy of pumping system.

The differential pumping becomes very efficient once the flow becomes transit and free molecular (below 10 mtorr). The guide forms a long and narrow channel between stages. At gas pressures below 0.1 Torr and channel width below several mm such channels are known to suppress gas conductivity by factor L/W, where L and W are length and width of the channel. This allows keeping a fair size opening in the ion guide.

Gas flow through the guide induces axial ion velocity. The interface walls become fully isolated from ions. The ion guide may extend all the way to vacuum chamber of any mass spectrometer, like a quadrupole and magnet sector. This invention is particularly useful for periodically operating mass spectrometers, like ITMS, TOF MS, FTMS or an orbitrap. A slow ion velocity could be used to improve duty cycle of TOF MS if using a conventional scheme of ion introduction into an orthogonal accelerator. The ion guide can be also used to store and to pulse eject ions into the orthogonal accelerator of TOF MS. A vacuum portion of the guide can be also used as pulse accelerator into MS. Such accelerator could be operating with slow passing beam, with periodically modulated slow passing beam or in store eject modes, when ions are trapped in an accelerator section and then released into a mass spectrometer.

The above described novel ion guide is compatible with multiple method of ion manipulation, as described in the above described FIGS. 10A-10L. As noted, there is an almost field-free zone inside the guide which allows multiple modifications of ion guide shape. As an example, an ion funnel may be formed to accept a large size ion flow and to compress it into a channel with smaller width/thickness. Multiple (at least two) ion guides can be merged to accept ion flows from different ion sources, like ESI and MALDI at intermediate gas pressure. Such merging ion guides could be time modulated by various plugs from the above described arsenal of methods (axial electrostatic field—direct or fringing, moving wave, magnetic field, gas flows). The guide could be used for storage and pulse ejecting into various MS, like ITMS, TOF MS with orthogonal injection, FTMS and orbitrap. A portion of ion guide at intermediate gas pressure can be used to excite ions, either for de-clustering or for fragmentation. The guide could be used to expose ions to reaction with gas, fast atoms or charged particles, particularly convenient since the guide holds charged particles of both polarities and has extremely wide mass range of trapped particles. A moving wave electric field, such as disclosed in FIG. 9B, could be used to control the temporal response of ion guide.

Mesh in a Symmetric RF Field

Figure 14A:
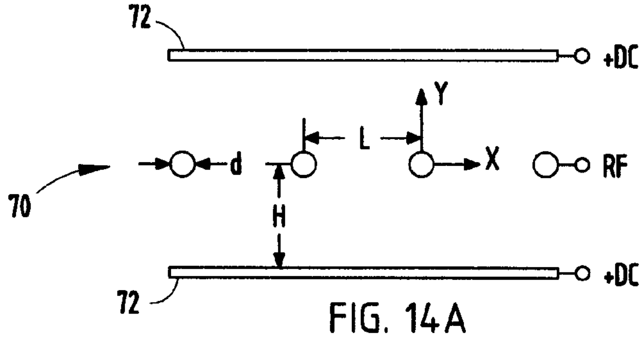
FIG. 14A is a schematic diagram which shows RF electrodes with symmetric RF field around a mesh.

Referring to FIG. 14A, spatially symmetric RF and DC fields are formed between a mesh 70 and symmetrically located plates 72. Similar to earlier described mesh systems, the power supplies could be connected in voltage—symmetric or asymmetric manner. For example, the drawing shows the mesh 70 being connected to RF supply and plates 72—to repelling DC supply. Multiple alternatives allow either keeping the mesh or plate at ground, or separating RF and DC between different electrodes or balancing supplies to arrange ground equipotential line in-between electrodes, while still generating symmetric RF and DC fields. The drawing shows a particular example of 2-D dimensional mesh formed of parallel wires with diameter d and spacing L=10 d. Distance to plates is chosen H=L. Electrodes are parallel to X direction and orthogonal to Y direction.

Figure 14B:
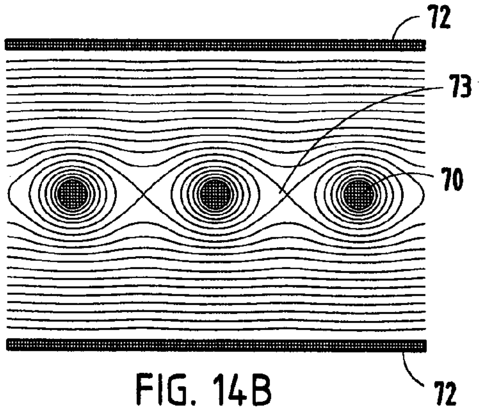
FIG. 14B is a diagram of the equipotential lines in the symmetric RF system of FIG. 14A.

Referring to the diagram of FIG. 14B, equipotential lines (U-equilines) are shown for the DC field. Equipotential lines become circular near wires and flat near surrounding plates. Spots 73 in the middle between wires are characterized by a saddle of potential, where local minimum is reached in Y direction and maximum in X direction. Near the origin 73, the field is mostly quadrupolar. As in any electrostatic field, global minimums of potential is reached on electrodes. At vacuum conditions, orbital trapping is possible. Once ions collide with gas, they loose energy and would fall onto the mesh surface (having the lowest DC potential).

The structure of momentarily RF field is identical to one in DC field. However, dynamic potential of the RF field differs from static potential and is defined by the strength of local electric field (eq. 1). Obviously, the field is higher near sharp wires and lower near flat walls. Spots 73 in the middle between wires ('middle spot') are characterized by zero electric field strength because of symmetry in the saddle point. That is why the spot has the smallest dynamic potential in the entire system.

Figure 14C:
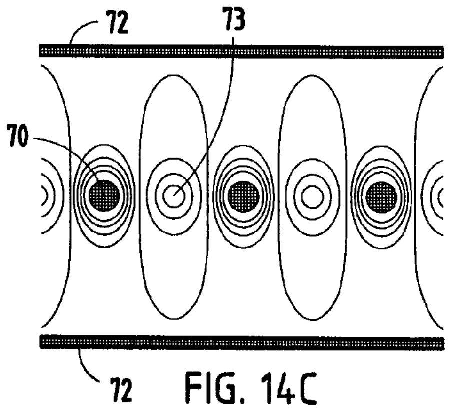
FIG. 14C is a diagram which shows the lines of equal strength of electric field E (E-equilines) for the symmetric RF system of FIG. 14A.

Referring to the diagram of FIG. 14C, the lines of equal strength of electric field (E-equilines) are presented. Lines correspond to normalized field strength E %=E/[$V_{RF}$/L] drawn with a step ΔE %=0.25 and from E %=0 to 2. E % reaches maximum near wires (E %=5), gets moderate near the walls (E %~1) and is zero in the middle spot 73 between wires (E %=0). The circular lines around the middle spot 73 indicate a local trap formed by dynamic potential. The trap 73 is similar to one formed in quadrupole, wherein a rotating saddle field creates a dynamic trap. Overall, the RF field repels ions from wires, traps them in-between wires and allows ions passing along the wires.

An appropriate combination of RF and DC fields may form a set of global traps, where local traps between wires become connected and ions may exchange between local traps. RF field repels ions from wires and DC field—from the walls, thus providing stable ion retention, both in vacuum and at intermediate gas pressures. The combined action is understood looking at profiles of total potential, including both static potential (DC component) and dynamic potential, formed by RF field.

Figure 15A:
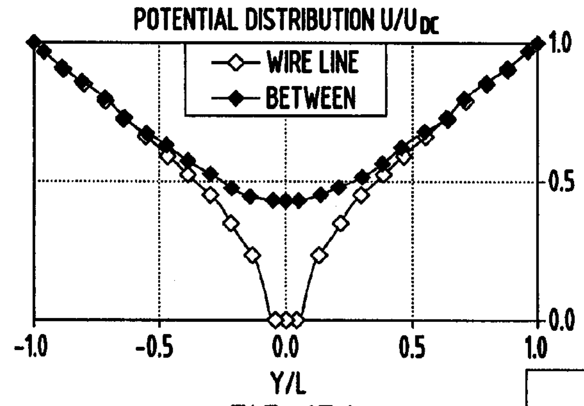
FIG. 15A is a graph of the potential distribution in the symmetric RF system.
Figure 15B:
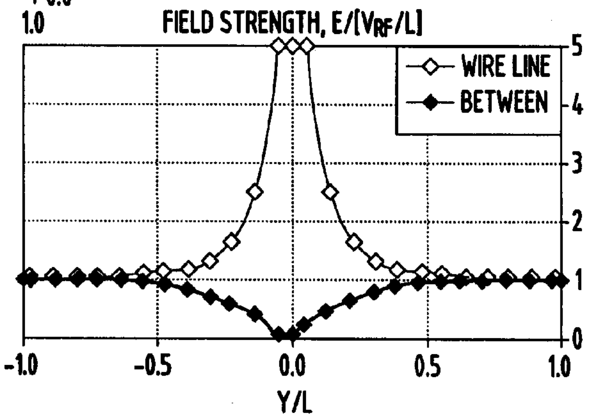
FIG. 15B is a graph which shows profiles of electric field strength in the symmetric RF system.

Referring to FIGS. 15A-15D, profiles of static, dynamic and total potentials are shown in two planes. Both planes are orthogonal to the mesh, one crosses wires (X=0) and another goes in the middle between wires (X=0.5 L). Profiles are plotted Vs normalized Y/L coordinate FIG. 15A shows profiles of normalized static potential U %=U/$U_{DC}$, which drops from walls to center and reaches an absolute minimum on wires. FIG. 15B shows profiles of normalized local strength of electric field E %=E/[$V_{RF}$/L]), which reaches maximum on wires and becomes zero in the middle between wires. According to eq. 1 for q<0.3 the effective potential D follows E as:

$$D=ze\cdot E^2/m\omega^2=D_0\cdot D\%=D_0\cdot(E\%)^2,$$

$$\text{where } D_0=ze*V_{RF}^2/mL^2\omega^2 \qquad (7)$$

Total potential is then could be expressed via normalized U % and E % as:

$$V*=U_{DC}\cdot U\%+D_0\cdot(E\%)^2=U_{DC}\cdot[U\%+g\cdot(E\%)^2]$$

$$\text{Where } g=D_0/U_{DC}=D_0=ze*V_{RF}^2/[U_{DC}\cdot mL^2\omega^2]q\cdot V_{RF}/U_{DC}$$

The relative effect of the RF field verses DC field is defined by dimensionless factor g. Such factor is defined by RF and DC voltages, RF frequency and ion mass and is proportional to ratio of RF and DC voltages times factor q. By varying factor g one can examine profiles of total potential at various relative impact of RF and DC fields by expressing dimensionless total potential as V* %=U %+g·(E %)$^2$.

Figure 15C:
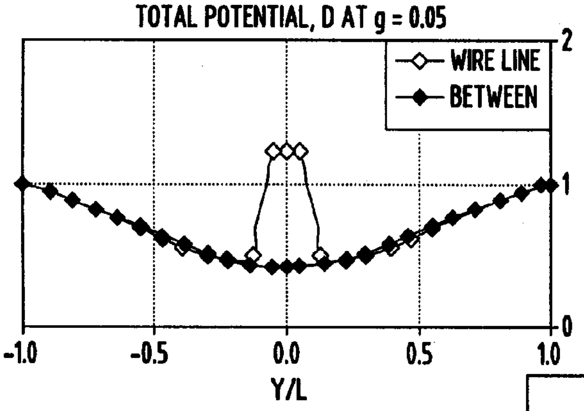
FIG. 15C is a graph which shows profiles of total potential in the symmetric RF system for an RF factor g=0.05.
Figure 15D:
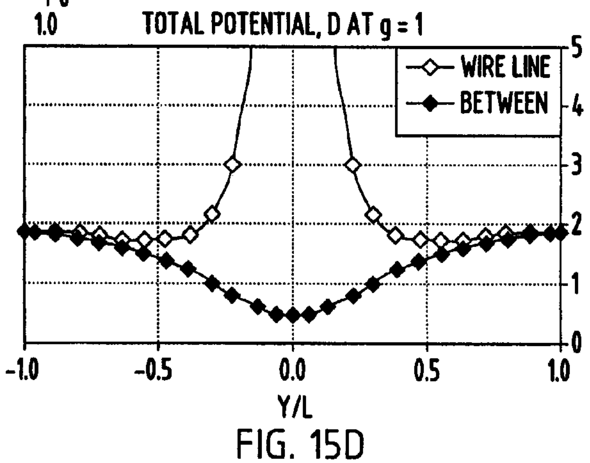
FIG. 15D is a graph which shows profiles of total potential in the symmetric RF system for RF factor g=1.

Such profiles are shown in FIGS. 15C and 15D for g=0.05 and g=1. One can see that for both particular cases there is a channel with lowest total potential (between Y=0.3 and Y=0.5) connecting even deeper traps in spots between wires (X=0.5 Y=0). The topology changes once DC attraction overcomes the RF repulsion by mesh wires, occurring after g<0.02. In another extreme case of almost pure RF field (say, g>100) the RF repulsion overcomes DC attraction at wire line. The dynamic potential of RF field depends on ion mass. However, the topology of global traps connected to channel stays within some mass range.

Figure 16A:
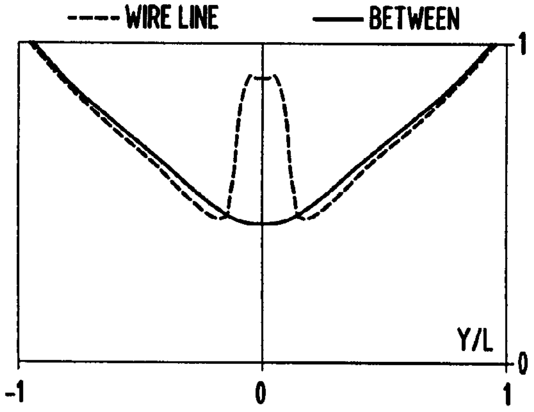
FIGS. 16A-16C are graphs which show profiles of total potential in the symmetric RF system at factors g varying from 0.035 to 0.015.
Figure 16B:
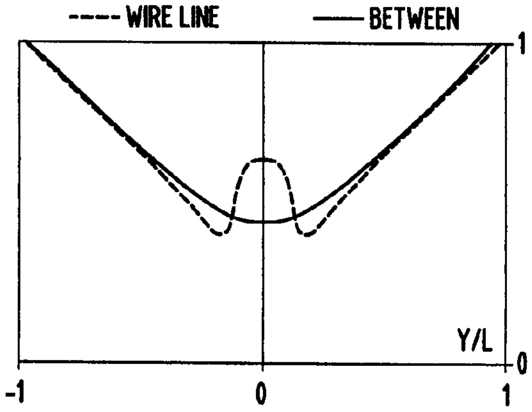
Figure 16C:
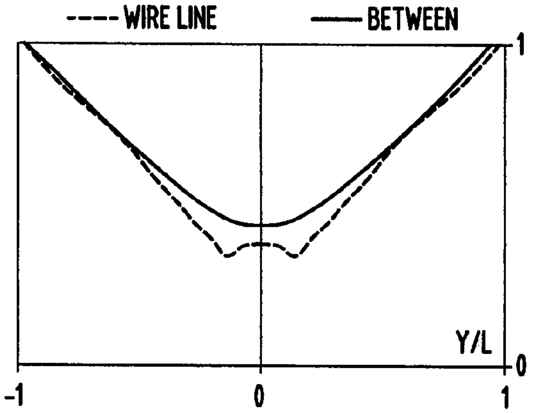

Referring to FIGS. 16A-16C, at g below 0.04, the local ion trap 73 becomes connected to a space above wires, and ions are released from trap 73 into the channel The released ions are free to leave the trap and travel. To drive ions, one can use factors like gas flow, moving electrostatic wave, moving magnetic field, etc. The effect of mass selective trapping and release could be used for mass separation. The release could be assisted by AC excitation of secular motion to improve resolution of mass selection.

Figure 17:
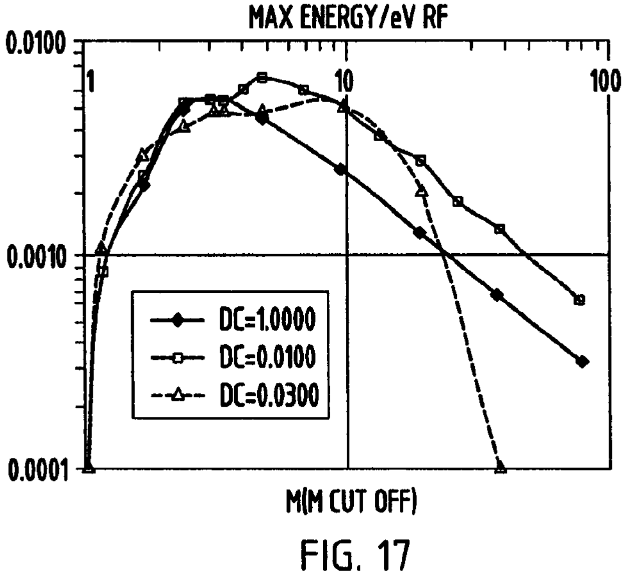
FIG. 17 is a graph which shows a normalized total potential as a function of ion mass of the symmetric RF system.

Referring to FIG. 17, the operable mass range is examined for the symmetric RF trap around mesh of FIGS. 14A-14C. The total barrier is determined as the maximum ion energy at which ions still stay within individual ion traps 73 between the wires of the mesh 70. Masses are normalized to a low cut off mass. A clearly observed low mass cut off is explained by ion resonance in quadrupolar field near central spots. Let us assume that similarly to quadrupolar field, the cut off occurs at q=0.91. Then, the geometrical scale G of the trap is G=0.85 L. In the particular simulated example, the cut off mass equals to 125 amu at geometrical size L=1 mm (G=0.85 mm), single phase RF voltage amplitude $V_{RF}$=1 kV (p-p) and RF frequency 10 MHz.

The plot of FIG. 17 presents 3 curves, corresponding to different values of DC potentials normalized to amplitude of RF voltage. In particular, simulated case DC varied as 0 V, 10 V and 30 V. In case of DC=0 (dominating RF field), the barrier is limited to 0.007 of $V_{RF}$ (7 eV at 1000 V p-p) at q~0.3 (m=3*$m_{cutoff}$) and then drops proportionally at a lower q (higher mass). By setting the RF amplitude to 1000V and assuming the threshold energy level for ion retaining at 1 eV, the mass range of RF only in the trap appears narrow—approximately factor of 20. One way of improving mass range is bringing walls closer, which would complicate ion introduction into the trap as discussed below. Another way is to add an optimum DC voltage of about 10 V (dashed line in FIG. 17). A DC field (applied between flat electrodes and the mesh) improves the barrier height, and apparently expands the mass range by at least factor of 2. The result is unusual, compared to conventional quadrupoles where DC field between rods shrinks mass range. In this particular case the mesh trap is strongly asymmetric and barrier is much lower between the trap and the flat electrode. Adding a DC field improves the weak barrier in the Y direction towards flat electrode, while it weakens the strong barrier in X direction towards the mesh wire.

Ion Chromatography

Figure 18A:
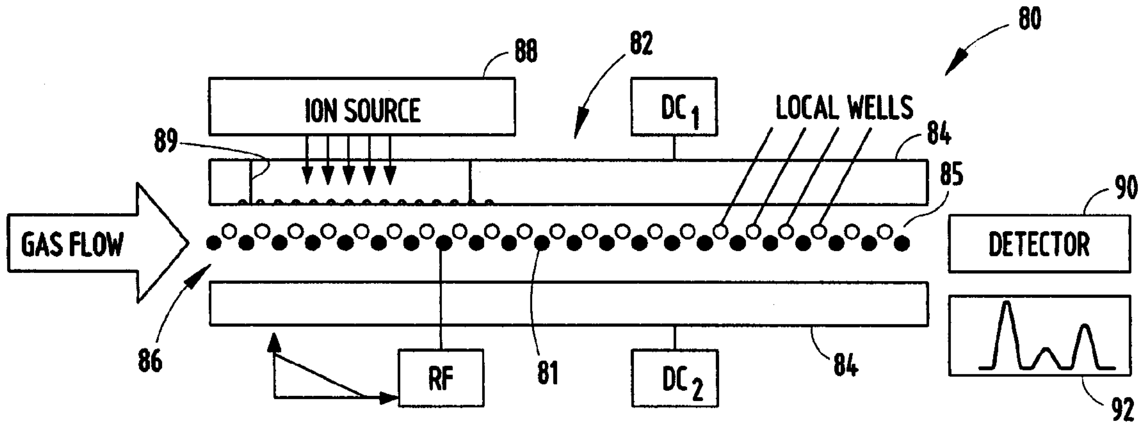
FIG. 18A is a schematic side view of a pulsed ion converter for TOF MS.
Figure 18B:
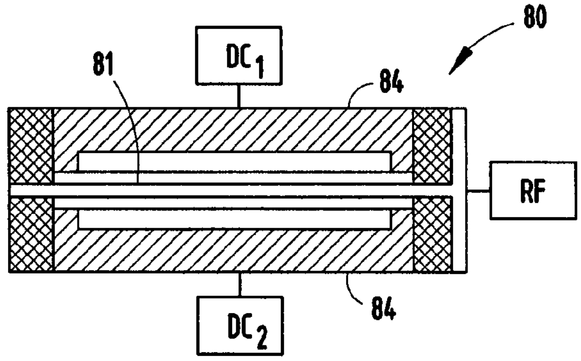
FIG. 18B is a schematic end view of a pulsed ion converter for TOF MS.

Referring to FIGS. 18A-18B, the above symmetric RF field around wire mesh is proposed for a novel way of mass separation, which is defined in this application as 'ion chromatography'. The preferred embodiment of ion chromatograph 80 comprises a rectangular and long channel 82 formed by parallel plates 84 with side walls for ion retention. Wires 81 are placed orthogonal to the long channel. An RF signal is applied to the wires and two separate DC signals ($DC_1$, $DC_2$) to plates 84. Ions from any known gaseous ion source such ESI, APPI and MALDI are introduced through the side window 89, covered by a fine mesh. Pumping at the exit side of the channel is used to draw gas flow through the channel. The device is preferably miniaturized using MEMS technology to about 10 um size between wires and walls, while the length of the channel is in the range of 1-10 cm. The RF frequency preferably is in 0.1-1 GHz range. Gas pressure is preferably selected between 0.01 and 1 of atmospheric pressure.

In operation, ions are introduced from the ion source 88 through the side window 89 and into the channel 82. The combination of RF and DC voltages is chosen to trap ions of wide mass range within multiple wells formed between wires. DC voltages are adjusted such that to create a weak imbalance. As a result, the equilibrium position of ions is shifted from the centers between wires towards one of plates. After filling stage, the source is switched off and either RF voltage is slowly ramped down and/or DC asymmetry is increased. As a result, barriers become shallow. The barrier height is smaller for heavier ions. As a result, the heaviest ions are released first and travel along the channel towards the device exit 85 being driven by laminar gas flow. As a result of interactions with multiple traps, the collection of initially trapped ions will be separated in time. The time dependent signal on the detector 90 past the device is converted into a mass spectrum shown as 92.

Ion 'evaporation' from shallow wells occurs due to thermal energy. The process is similar to particle interaction with a surface in chromatography. Average time spent on the surface depends on the binding energy. Multiple events of evaporation (counted as theoretical plates) narrow the distribution of retention time. Resolution of chromatography rises as square root of number of theoretical plates. In case of ion chromatography, each micro-trap between wires acts as a plate in chromatography. Ions get into a shallow well and spend some time before getting out. The 'sticking' time exponentially depends on the well depth, which in turn is a function of m/z of ions.

Miniaturization of the device is suggested for making a massive array of sequential ion traps. Relative inaccuracy of making individual small cell leads to a very moderate mass resolving power per cell. At 10 um size and 0.3 um accuracy resolving, power per cell is expected to be below 10. However, sequential pass of multiple cells is expected to improve resolving power proportional to square root of cell number. The 10 cm chip holding 10000 traps (filters) would provide 1000 resolving power, sufficient for example for environmental applications. Similarly to gas chromatography where a gradient is formed by varying temperature, in ion chromatography, a 'gradient' can be formed by varying RF and DC voltages, AC signals, temperature, or parameters of the gas flow.

Pulsed Ion Converter for TOF MS

Figure 19A:
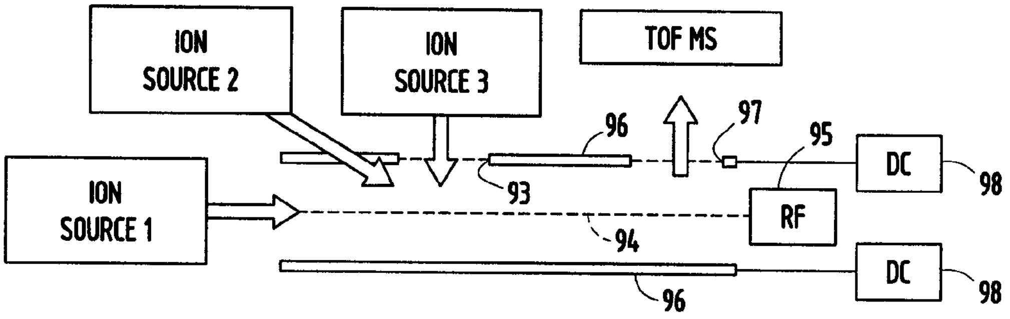
FIG. 19A is a block and schematic view of an ion converter for TOF MS with a symmetric mesh device.

Referring to FIG. 19A, the preferred embodiment of a pulsed ion converter for TOF MS comprises an ion manipulator formed of mesh electrode 94, symmetrically surrounded by planar electrodes 96, and an RF generator 95 connected between the mesh and electrodes. The mesh is formed of parallel wires oriented along the channel Preferably, the mesh is connected to a switched RF generator and side electrodes are connected to one or more pulse generators 98. The manipulator forms an array of parallel ion guides called an "array guide". The guides also could be considered linear ion traps if ions are repelled at the guide's edges. The pulsed ion converter further comprises an external ion source, preferably having an intermediate ion storage device (e.g. ion guide at intermediate gas pressure). The converter also comprises pumping means to reduce gas pressure at the exit side. Alternatively, an internal ion source is used. The source can employ solid or gaseous sample bombardment by ions (SIMS), photons (PI or MALDI), electrons (EI), or expose the sample to ion-molecular reactions for ionization (CI).

Figure 19B:
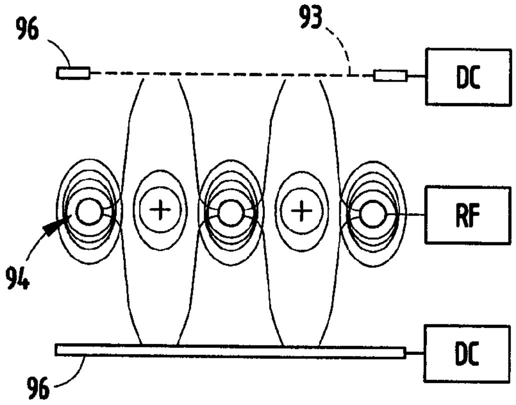
FIG. 19B is a diagram which shows a cross section of the pulsed ion converter with iso-lines of dynamic potential.

Multiple ion guides of the array guide can be filled by injecting ions into a space between side electrodes, either along the mesh (Source 1—parallel injection) or orthogonal (Source 3) to the mesh (orthogonal injection) through window 93. In case of parallel injection, ions stay between side electrodes for sufficiently long time ensuring ion to gas collisions and ion trapping between plates. In case of orthogonal injection, it is preferable to arrange multiple ion passes between the storage guide and trap array. After multiple passes, eventually ions collide with gas and get trapped between side electrodes. Regardless of injection scheme, once ions are trapped between side electrodes, they start oscillating in the confining wells formed by RF and DC fields and jump between individual linear cells of the mesh. Eventually, after collisional dampening ions are confined within individual RF linear cells, where the dampening time T depends on gas pressure P. At gas pressure around 50 mtorr (same as in an ion guide), the dampening takes 0.1 ms of time. Because of chaotic ion motion between traps, the dampened ions are expected to be distributed statistically even between multiple cells. Alternatively, ions are injected into a region (Source 3) of ion trap which has a much higher gas pressure sufficient for ion trapping in single pass. Preferably, the guide is extended between multiple stages of differential pumping, and gas flow moves ions along the one dimensional trap into a different segment with a much lower gas pressure. Regardless of ion introduction methods, ions are dampened in gas collisions and confined to axes of ion guides, as shown in FIG. 19B. Ions move along ion guides toward the exit side at lower gas pressure. At the vacuum side of the converter, ions are pulse ejected into a TOF MS.

Figure 19C:
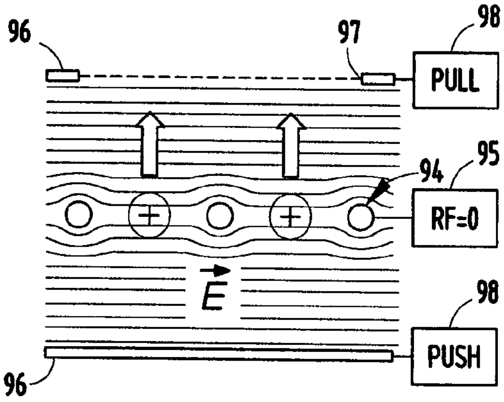
FIG. 19C is a diagram which shows a pulsed ion converter at the ion ejection stage.

To eject ions the RF signal should be switched off. As an example, the RF switching is made by removing a driving signal from a primary coil and by breaking contact between two halves of the secondary coil. Alternatively, the secondary coil is clamped by FTMOS transistors. To reduce effect of transistor capacitors, the transistors are connected via diodes with small capacitance. The circuit stops being resonant and RF oscillations decay rapidly within a cycle or two. Once oscillations stopped, pulses are applied to surrounding plates (FIG. 19C) and ions are extracted by electric field through a window 97 in one of plates 96. Depending on the mesh shape, such window can look like a set of holes, a set of groves, or a single window, covered by a fine mesh. Note that distortion of extracting field near wires has a minimal effect because of ion central position within mesh cells.

There are two distinct options of the pulsed ion converters for TOF MS. One (FIG. 19C) employs an ion guide slowly transferring ions and pulsing ions out of the guide. Another (FIG. 19D) employs a planar ion trap. The specification has already disclosed multiple embodiments of ion manipulators which are suitable for both types of pulsing ion sources. The manipulator (including both ion guide and ion trap) may comprise RF repelling mesh in combination with one of: the same repelling RF mesh wrapped into a cylinder or a box of arbitrary shape; or another repelling RF mesh, or DC repelling electrode, or electrodes forming a moving wave of electrostatic field. The manipulator may also comprise a trapping RF mesh in a form of parallel channels (mesh made of parallel wires) or in shape of individual cells. The manipulator may also combine multiple ion manipulators. For example, an ion guide may be connected to an ion trap or multiple ion traps and such connection could be either in-line or orthogonal, either made by merging and splitting ion channels or by intersecting manipulators. A few embodiments are described below.

Miniature Ion Converters for TOF MS

The particular embodiment shown in FIG. 19A illustrates the power of miniaturization. The mesh 94 within symmetric RF field acts like an array of ion traps, spread along the mesh sheet. In case when the mesh is formed of parallel wires the individual traps are two dimensional and in case of square (hexagonal) mesh cells, the traps are three dimensional. Traps are well isolated from each other and shielded by mesh wire, except the above described case when ions near the mass range boundary start moving between cells.

The converter operates as follows. Ions are injected from an external ion source, preferably orthogonally (similar to source 3 in FIG. 19A). Ions are trapped within cells due to dampening collisions with gas. RF and DC voltages are chosen to release ions into space between electrodes and mesh, such that ions exchange between trap cells. Eventually, a portion of ions are confined within cells near the exit side. Then, an extracting pulse is applied to eject ions into a TOF MS.

There are readily available meshes with small cell size, which allows making large arrays of microscopic traps. Say, 250 LPI mesh (250 lines per inch) is reasonably stable while having 10 μm cell size. First of all, it allows fitting a large number of traps per square cm and as a consequence to hold large space charge. As much as one million ions per square cm could be stored while keeping one ion per cell. If using smaller cells or a lower ion density, say 100,000 ions per $cm^2$ the average density drops to 0.1 ion per cell and probability of having two ions in the cell becomes 0.01. Thus, microscopic mesh trap could hold large space charge without having any effect of space charge on ion characteristics. However, even assuming a very tight size of ion cloud (1 μm) the space charge excitation appears only when number of ions exceeds 10. Assuming 1 $cm^2$ trap array, the trap can hold up to $10^7$ ions and can inject into TOF MS up to $10^{10}$ ions/s accounting for a 1 KHz repetition rate, which corresponds to 1 nA current. Such current limit suits the majority of mass spectrometric ion sources.

The small size of traps potentially can lead to another advantage, a high repetition rate. Because of relatively small distance between mesh and side electrode (0.01 mm), the number of gas scattering collisions is small. At 50 mtorr gas pressure and 0.01 mm ion path, the probability of scattering collision is below 5%, while collisional dampening occurs faster than in 0.1 ms.

Though 10 μm cell size is readily available, it is technically difficult to space the mesh at 10 um distance to flat wall or to another mesh. This can be solved by using MEMS and PCB technologies, similar to those described in connection with FIGS. 12A-12C. For example, a symmetric system of closed channels could be made by covering external sides of the mesh by insulator and then clamping the mesh between plates similarly to FIG. 12B. Open cells could be formed by perforating 5 layer sandwich similar to FIG. 12C.

The microscopic mesh localizes ions within a very narrow sheet. The sheet thickness can be estimated as h=L*sqrt (kT/D) and for L=10 μm cells, $V_{RF}$=300V the barrier D varies from 0.2 to 2 eV and the ion cloud could be compressed to h<L/3=3 μm=0.003 mm. The phase space of the ion ensemble is calculated as a product of spatial and temporal spreads ΔX*ΔV. Typical ions of m/z=1000 amu have thermal velocity about 60 m/s which makes ΔX*ΔV=0.2 mm*m/s.

The phase space of the ion cloud is dramatically lower than in any known ion source compared, for example, to the phase spaces of an ion beam of an orthogonal accelerator of a TOF MS. The beam is at least 1 mm wide and has at least 1 degree angular spread at 10 eV axial energy, which translates into 10 K ion temperature and 10 m/s velocity spread for 1000 amu ions. The phase space of the beam is then estimated as 10 mm*m/s. According to the above calculations, the trap with 10 um cell provides a fifty times smaller phase space. If using other mesh sizes, the mesh ion source for TOF MS stays advantageous to conventional orthogonal accelerators until the cell size stays below 0.5 mm and ion cloud size stays below 0.15 mm.

The much smaller phase space could be converted into much smaller time and energy spreads of ion packets ejected into a time-of-flight mass spectrometer. If the ion cloud is accelerated by a suddenly switched electric field of strength E, the time spread of the cloud is primarily defined by a so-called turn around time ΔT=ΔV*m/Eze. A higher field strength E reduces the turn around time but induces a proportional energy spread Δϵ=ΔX*Eze. The product of two equals to ΔT*Δϵ=ΔV*ΔX*m, i.e. directly tied to the initial phase space of ion cloud prior to acceleration. To use the advantage of much smaller phase space in the novel mesh trap, a higher strength of accelerating field E, compared to o-TOF MS is used. Indeed, typically employed in o-TOF MS field strength around 100 V/mm is much lower compared to maximum reachable fields up to 30 kV/mm limited by gas discharge or 1 kV/mm limited by leakage on an insulator surface. At microscopic sizes, it is expected that both gas and surface discharges do not occur below some absolute potential in the range of several hundred volts. For U=100 V and L=10 μm, the E value reaches 10000 V/mm, which is 100 times higher than in o-TOF MS.

Alternatively, a method of time lag focusing is applied. The confining RF field is switched off or substantially relaxed for cooling of ion internal energy. The accelerating field is applied after a predetermined delay, small enough to still retain ions in the cell. During free expansion, the phase space of the beam is conserved and though the spatial spread rise the velocity and position become highly correlated which improves time-of-flight focusing in TOF MS though at slightly different tuning conditions in TOF MS.

Particular Embodiments of Pulsed Converters

Figure 19D:
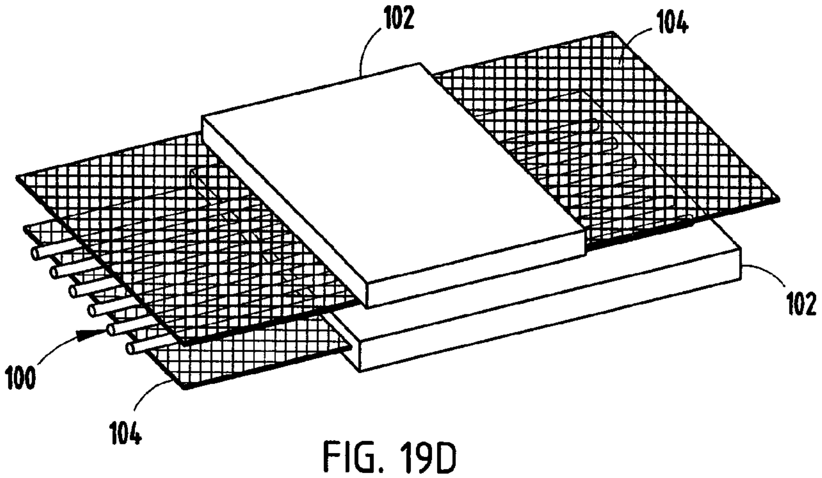
FIG. 19D is a schematic view of a pulsed ion converter.

Referring to FIG. 19D, the preferred embodiment of a pulsed ion converter for a TOF MS comprises a central mesh 100 placed between two parallel surrounding electrodes 102, comprising fine mesh windows 104 to allow movement of ions into and out of the system. The RF signal is applied to central mesh thus forming an array of linear guides (or troughs) between wires of the coarse central mesh. A slight DC bias is applied between central and side meshes at transport phase to improve mass range of caught ions as described above. The central mesh is made of wires and positioned along the direction of ion transportation. The system of parallel meshes forms a so-called mesh ion guide. The mesh ion guide protrudes between stages of differential pumping. The mesh is put through an orifice (slot, channel) separating areas of (a) medium gas pressure region (with up to one collision per ion per period of RF field oscillations) and (b) high vacuum region (with negligible number of collisions with ambient gas). In the particular case of FIG. 19D, the ion mesh guides spreads between two stages of differential pumping. It is preferable to keep electrodes 102 uniform and to arrange differential pumping via side edges of the channel.

In operation, ions are introduced from an external ion source and injected into mesh guide, either axially or orthogonal. As an example, a nozzle, or a skimmer, or a fine size ion guide could be placed closely to mesh ion guide. Alternatively, the mesh ion guide intersects the gas jet or a transportation guide of ion interface. Medium gas pressure is chosen high enough (between 0.01 and 1 Torr) to capture ions into the mesh ion guide within a single ion pass. The mesh electrode system (including central and side meshes) is arranged uniform in the way to keep the linear traps undisturbed along the transportation direction. The transfer between stages does not induce any additional kinetic energy so the ions stay cold and confined. Ions drift into vacuum due to gas pressure gradient and due to gradient of accumulated space charge. Additional weak electric and magnetic fields, supporting the transportation, can also be applied by known means. Preferably, the ion guide is terminated at the far end by an electrostatic plug, thus forming an ion trap in the vacuum portion of the mesh ion guide. Though, the plug may appear unnecessary if ions drift at sufficiently slow velocity about 10-100 m/s and vacuum portion fills at a time comparable to TOF MS pulsing period. Ions drifting into the vacuum portion stay undisturbed and confined near axes of linear traps. In vacuum region the mesh and surrounding electrodes form a part of pulsed acceleration region of TOF MS. Periodically the ion content is ejected through the fine mesh 104 of the mesh ion guide. RF voltage is preferably switched off and pushing and pulling pulsed voltages are applied to the surrounding electrodes.

Alternative embodiments of the pulsed converter comprise a single stage mesh ion trap which employs gas pulses, generated by one of: pulsed gas valve, vapors desorption from cold surface by a pulsed particle beam, such as a beam of ions, electrons, fast neutrals, particles generated in gas discharge, photons or droplets.

Figure 20A:
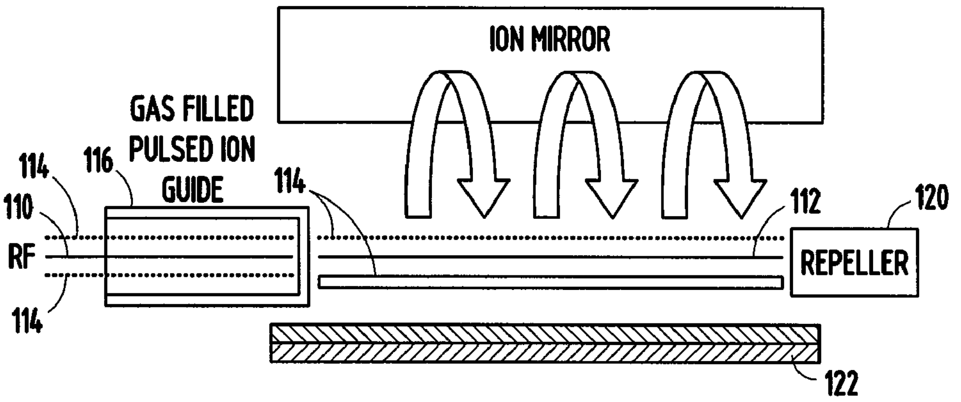
FIG. 20A is a schematic side view of a pulsed ion converter with two sets of mesh guides and showing main elements of TOF MS.
Figure 20B:
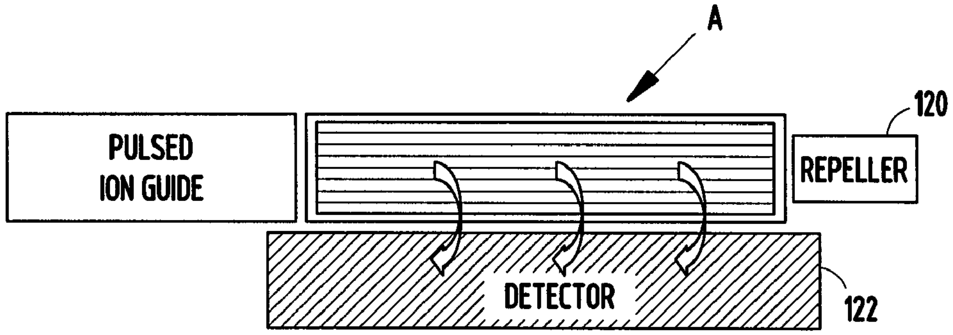
FIG. 20B is a schematic top view of a pulsed ion converter with two sets of mesh guides and showing main elements of TOF MS.
Figure 20C:
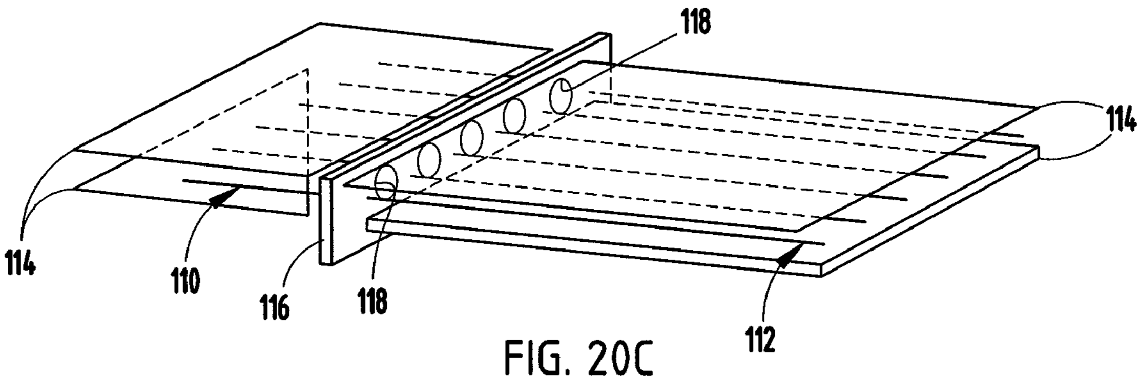
FIG. 20C is a perspective view of a pulsed ion converter with two sets of mesh guides.

Another preferred embodiment of a pulsed converter of continuous ion beams into pulsed packets is shown as a side view in FIG. 20A and as a top view in FIG. 20B. The preferred embodiment comprises two separate and aligned mesh guides 110, 112, placed within separate pumping stages. Both guides are made of parallel wires which are sandwiched between plates or fine grids 114. The first mesh guide is filled with gas, while the second mesh guide is at substantially vacuum conditions. The stages are separated either by an electrode 116 with a set of apertures 118, as shown in FIG. 20C, or by the gate electrode, being made as a segment of surrounding plate.

In one particular case, the same set of wires is used for both stages. RF signal is applied to wires. As described earlier, slight repelling potentials are applied to surrounding plates to improve ion retention between wires. The DC potentials of surrounding plates are different between stages, which keeps a difference in potentials of the central line between wires. The vacuum mesh guide is optionally terminated by a static or an RF ion repeller 120.

The guide serves as a pulsed converter for a time-of-flight mass spectrometer. Above the guide, there is placed a DC accelerator (not shown) and an ion mirror. The TOF MS detector 122 is preferably placed by the side of the mesh guide as shown in the top view in FIG. 20B.

In operation, a continuous ion beam enters the first mesh guide. An earlier described ways of side ion injection into the first mesh guide is the most convenient way of injection. The first mesh guide is filled with gas and operates as an array of ion storing linear traps. The gate or the set of apertures at the exit side (i.e., right side) lock ions, e.g. by a slight repelling DC potential.

Periodically ions are released into the second vacuum mesh guide. The vacuum mesh guide is filled with ions during the filling time stage. The potential difference between surrounding plates controls the axial energy of ion propagation. The duration of the release pulse may vary from 10 us to 100 us. Preferably, ion propagation energy is chosen around 1 eV. Preferably the vacuum portion of the guide is extended for at least 5 cm to increase duty cycle of the pulsed conversion of the continuous ion beam. The pulsed beam propagates into the second portion of the guide with a velocity varying from 0.3 mm/us for 2000 amu ions to 2 mm/us for 50 amu ions. Thus, the fastest ions will pass the guide within 25 us and the slowest ions would fill only the initial part of the guide within the same 25 us period. The ion filling time may be extended by allowing the fastest ions to be repelled from the back end of the vacuum mesh guide. Most important, all ions of the entire mass range would be located within the vacuum ion guide by the end of the filling stage.

On the next stage of the guide operation, the surrounding plates and meshes of the vacuum mesh guide are pulsed to high voltages to create a uniform extracting field. Preferably the RF signal on central wires is clamped to avoid distortion of the extraction field. Ions are ejected from the vacuum mesh guide, are accelerated in DC accelerator, fly through a drift space, are reflected by ion mirror and impinge upon the wide ion detector 122. Side displacement of ions is arranged either by steering plates, or by side tilting of the accelerator or by side tilting of the mirror. Because of low (1 eV) ion energy in horizontal direction, the beam gets a small spread in this direction, even if using a repeller at the back of the vacuum mesh guide. Presently existing detectors of 10 cm long are capable of full ion collection.

By the time the heaviest ionic components are on the detector, the vacuum mesh guide is filled again. The period between ejection pulses is adjusted according to flight time in TOF MS and may vary from 30 us in case of short TOF MS to several milliseconds in case of multi-reflecting TOF MS.

This embodiment provides a 100% duty cycle of ion conversion into pulsed ion packets and allows the formation of very sharp ion pulses if using a miniaturized mesh guide while employing large extraction fields as described earlier. Also, the invention allows handling large ion currents in the nA range, since the guide is tolerant to space charge repulsion—ions stay entrapped within the vacuum mesh guide.

Referring again to FIG. 20C, one particular embodiment of the mesh guide employs two separate sets of wires 110, 112. To align and to stretch both sets of wires, insulator strings support fine metal capillaries. Alternatively, the wires are made of metal coated quartz strings. Yet, alternatively separate sets of wires are made by MEMS method.

One possible disadvantage of the previously described embodiment is a moderate capacity to space charge. Methods of ion manipulation described in the entire application allow making pulsed converters with a wider storing gap and with stronger ion repulsion from the walls of the converter.

Figure 21A:
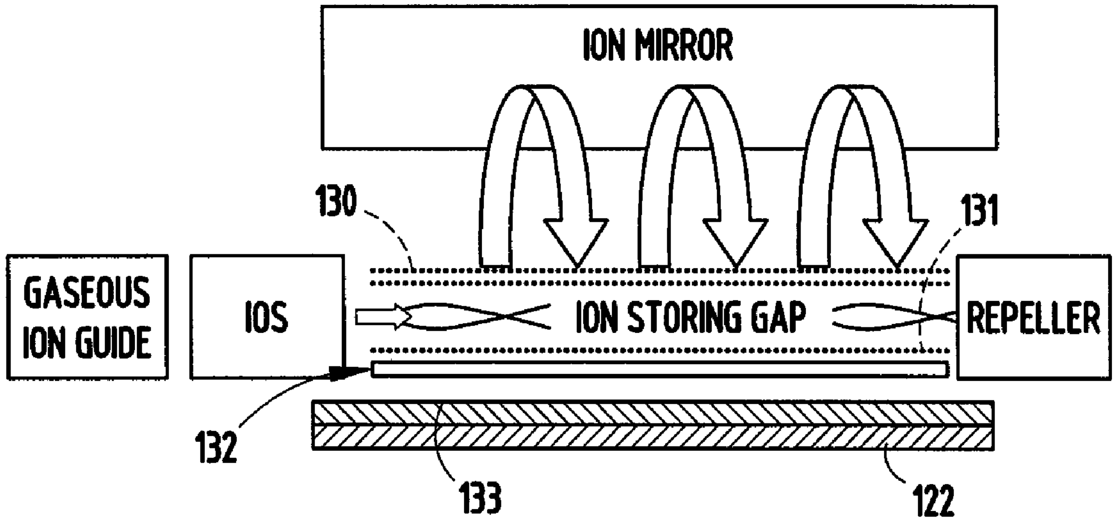
FIG. 21A is a schematic side view which shows a pulsed ion converter with an ion-storing gap built of repelling surfaces.
Figure 21B:
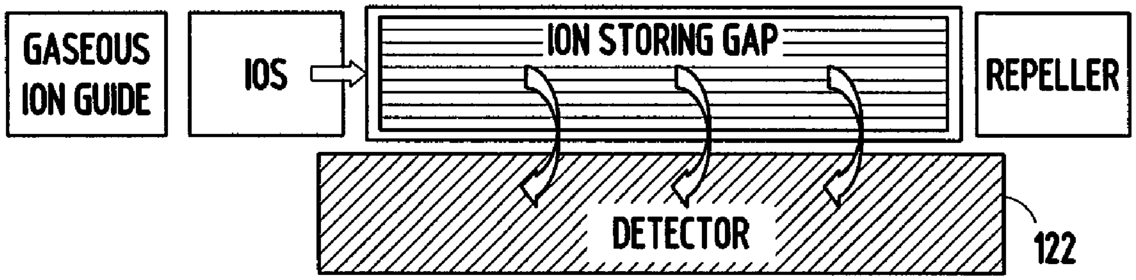
FIG. 21B is a schematic top view which shows a pulsed ion converter with an ion-storing gap built of repelling surfaces

Referring to FIG. 21, yet another preferred embodiment of the pulsed converter for TOF MS comprises a gaseous ion guide, an ion optics system (10S) for transferring ions, an ion storing gap, and an optional repeller at the end of the gap. The ion storing gap is surrounded by two ion repelling surfaces 130, 132. At least one ion repelling surface 132 (the bottom one in the drawing) comprises the ion repelling surface with fringing RF field described earlier. The surface comprises a fine mesh 131 or a set of parallel wires and a plate 133 under it. The distance between the mesh and the plate is comparable to the mesh period. An RF field is applied between the mesh and the plate. The ion storing gap also serves as an ion acceleration gap for TOF MS. The drawing shows major components of TOF MS—field free gap, ion mirror and ion detector 122, preferably placed by the side of the ion storing gap (FIG. 21B).

The top repelling surface 130 of the ion storing gap can be one of: another ion repelling surface with fringing RF field, though, in this case the surface is formed by two meshes as shown in FIG. 21A; a single mesh with a weak DC repelling potential; or a set of parallel wires with spatially alternated RF potential.

In operation, an ion source (not shown) forms ions within some m/z range. For example, ESI sources typically form ions with m/z between 30 and 2000 amu. Ions get into the gaseous ion guide. The guide dampens ions and passes them into the transfer ion optic system. Preferably, the gaseous ion guide is operated in a pulsed mode which is synchronized to pulses of the TOF MS. The ion optics system forms the ion beam which fits the width of the ion storing gap while minimizing angular divergence of the beam. Ion beam enters the ion storing gap at relatively low energy, preferably, from 1 to 10 eV. The gap is extended for at least 5 cm long. Ions get reflected from ion repelling surfaces this way remaining within the ion storing gap. Optionally, lighter ions get repelled from the end repeller. At such conditions, the storing gap is filled with ions of the entire mass range within 20 to 50 us.

In the next stage of operation, the ion storing gap is converted into an ion accelerator. The RF field is clamped and pulses are applied to ion repelling surfaces to generate a uniform extracting field. Ions are extracted from the ion storing gap, are accelerated in a DC accelerator (not shown), and are reflected in the ion mirror and reach the ion detector. In particular case of side location of the detector the ion packets are steered wither by deflector past the DC accelerator, or by side tilting the ion storage gap, or by side tilting of the ion mirror.

Multiple electrical arrangements are possible for switching of the potentials on the elements of the repelling surfaces. Direct switching between RF signal and high voltage pulse is technically difficult, though possible, using high voltage switches connected via low capacitance diodes or using high frequency linear amplifiers. In the case of a DC repelling mesh, the switching between DC repulsion and pull pulse can be formed with a standard pulse generator. In case of the repelling surface with the fringing RF field, the RF field applied to the bottom plate is clamped and high voltage pulse is applied to the mesh above the plate.

Summarizing multiple preferred embodiments of ion pulsed converters (also termed as pulsed ion source), the new methods of ion manipulation of the invention are employed to create RF channels either retaining ions between wires or repelling ions from surfaces with an RF fringing field. Ions are slowly injected into geometrically long ion converters. The guide elements are switched electrically to form a substantially uniform extracting field to form ion packets which are injected into a time of-flight mass spectrometer with a large geometrical acceptance. The converters fully accept ion beams from gaseous ion guides. The converters have a unity duty cycle and wide mass range of accepted ions. With the use of micro devices, the converters form very short ion packets which improve resolution of TOF MS.

Glossary for Terms Used in Claims:

An ‘ion’—means charged particles comprising ions of both polarities, electrons, charged droplets and solid particles. In case of using strong fields the disclosed devices are also applicable to electrically polarized particles ‘Ion chromatography’ means a way of mass separation.

‘An ion manipulator’ comprises multiple devices like an ion channel for ion passage, an ion guide for dampening and preparation of well confined and cold ion beam, an ion guide with axial field for rapid passage of ions, a fragmentation cell, an ion trap to store ions, an ion source to prepare ions for injection into mass spectrometer, and an ion source to prepare a pulsed packet of ions for time of-flight mass spectrometer.

A term ‘ion trap’ is used in a general sense for any of the following: ion accumulation from continuous ion beam, for ion storage, for mass selective ion sampling, for mass selective or total ion fragmentation, for mass filtering, mass selective ion sampling, and, finally, for ion mass analysis.

A ‘mesh’ means an electrode with holes, meaning a variety of embodiments comprising woven or electrolytic mesh, a set of parallel wires, or a perforated sheet. The shape of a mesh sheet can be planar, arbitrary cylindrical or spherical. In method claims, ‘mesh’ denotes a periodic electrode structure, which allows forming periodic electrostatic (RF or DC) fields.

A ‘repelling RF mesh’ stands for device comprising a mesh electrode, a second electrode behind the mesh electrode (relative to zone of ion manipulation) and a radio frequency (RF) voltage supply connected between said electrodes.

A ‘trapping RF mesh’ stands for device comprising a mesh electrode, two surrounding and interconnected electrodes and a radio frequency (RF) voltage supply connected between said mesh and electrodes, such that RF field is substantially symmetric around the mesh.

A ‘gas supply’ is a flow of gas used for forming a net flow, to provide collisional dampening, to assist fragmentation, and to generate ion molecular reactions.

A ‘radio frequency field around a mesh electrode’ means a field created by applying a radio frequency voltage supply between a mesh electrode and any of surrounding electrodes. Such field is differentiated from a conventional and widely used method of creating a dipolar radio frequency field, wherein two poles of radio frequency supplies are connected to alternating electrodes.

‘Particle’ means ions of both polarities, electrons, droplets, dust particles, nuclear particles, photons in a wide range of wavelengths, fast atoms, neutral molecules including surrounding gas, vapors, dopant gas, aggressive vapors and gaseous impurities.

‘Breakdown voltage limit’ means a minimum voltage, below which electrical discharge does not occur at any gas pressure. The breakdown limit depends on the nature of surrounding gas and usually is in the range of 200 V.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. In a mass spectrometer, and ion manipulator guide comprising:

a mesh electrode having cells of a size ranging from 10 μm to 1 mm;

a space above said mesh electrode for transporting ions from an external ion source into the mass spectrometer;

a second electrode positioned behind said mesh electrode at a distance comparable to a cell size of said mesh electrode; and a radio frequency voltage supply coupled between said mesh and second electrodes to provide a radio frequency field above the mesh electrode for repelling the ions.

2. The ion guide of claim 1 and further including a third electrode located above said mesh electrode to form a substantially symmetric RF field around said mesh electrode.

3. The ion guide of claim 2 and further including a gas supply for supplying a flow of gas through said mesh electrode for collisional dampening of the ions, said supply comprising one of a continuous gas supply, a pulsed gas valve, and a cold surface exposed to a pulsed particle beam.

4. The ion guide of claim 3 wherein said gas supply provides a gas pressure range expanded proportionally to the frequency of said RF voltage source is in the range from about 1 Torr to about ambient atmospheric gas pressure.

5. The ion guide of claim 1 and further including at least one DC voltage supply coupled to at least one of said mesh and second electrodes.

6. The ion guide of claim 1 wherein said mesh defines mesh cells and wherein the average density of ions is adjusted below single ion per mesh cell.

7. The ion guide of claim 1 wherein said radio frequency voltage supply includes a secondary coil and is switched off either by disconnecting two parts of said secondary coil or by clamping outputs of said secondary coil by employing FTMOS transistors, said transistors being coupled by one of: (i) low capacitance diodes; and (ii) linear RF amplifier.

8. The ion guide of claim 1 wherein said mesh defines mesh cells and the geometrical scale of said mesh cells and distance between said mesh and said second electrode is below 3 μm and wherein the RF frequency is adjusted in the range from 100 KHz up to 1 GHz and in reverse proportion to said mesh cell size.

9. The ion guide of claim 1 wherein said mesh defines mesh cells and the geometrical scale of said mesh cells and distance between said mesh and said second electrode is below 1 mm; below 0.33 mm; below 0.1 mm; below 30 μm; below 10 μm; below 3 μm; below 1 μm; and wherein the RF frequency is adjusted in the range from 2 MHz up to 1 GHz and in reverse proportion to said mesh cell size.

10. The ion guide of claim 1 wherein said mesh electrode is supported and aligned using a dielectric material and wherein said dielectric material is a layer which has a shape of one of: a sheet between mesh and electrode; a bridge under mesh wires; islands under mesh wires; and a bridge between two mesh wires.

11. The ion guide of claim 10 wherein said mesh and dielectric layer form a sandwich and is made using one of PCB technology on rigid or flexible sheets; MEMS technology; controlled particle deposition; and oxidation of said mesh to form an insulating layer.

12. The ion guide of claim 11 wherein said mesh electrode is a repelling RF mesh electrode wherein an ion channel is formed by said repelling RF mesh electrode with a penetrating RF field and one of: a same repelling RF mesh wrapped into a cylinder or a box of arbitrary shape; another repelling RF mesh; a DC repelling electrode; a set of electrodes forming a moving wave of electrostatic field; and an RF trapping mesh.

13. The ion guide of claim 12 wherein said ion channel is formed into one of a bent channel; a loop channel; parallel channels of co-flows and counter-flows; a smooth or stepped funnel; merging channels; splitting channels; a channel with a free drain; a capped channel; a channel with a valve switch; an ion reservoir; a pulse damper; and an ion pump.

14. The ion guide of claim 12 wherein the ion flow within said ion channel is induced by one of: a gas flow; an axial electrostatic field; a moving wave of electrostatic field; and a moving magnetic field.

15. The ion guide of claim 1 wherein the ion guide serves as one of the following devices: an ion beam guide; an ion beam guide with collisional dampening; an array of parallel ion guides; an array of ion traps; an ion fragmentation cell; an ion storing reactor with particles; a cell for ion spectroscopy; an ion source for continuous injection into a mass spectrometer; an ion source for pulsed injection into a mass spectrometer; an ion packet pulsed source for injection into a time-of-flight mass-spectrometer; a mass filter; and a mass analyzer.

16. An interface for transporting ions from gaseous ion sources into a mass 1 spectrometer comprising at least an ion guide of claim 1.

17. The interface of claim 16 wherein said ion guide operates in a wide mass range of gas pressures from 1 mtorr and up to 1 atmosphere and wherein in order to ensure RF confinement, the mesh scale L and RF frequencies F are adjusted as: L(mm)<1/P(Torr) and F(MHz)>1*P(Torr).

18. The interface of claim 16 and including multiple nozzles employed to sample a higher gas flow from said gaseous ion source.

19. The interface of claim 16 wherein said ion guide extends through multiple stages of differential pumping.

20. A mass selective storage device comprising an ion guide of claim 16.

21. A pulsed ion converter, comprising an ion guide of claim 1 wherein the mass spectrometer is a time-of-flight mass spectrometer, wherein ions are injected into the converter from an external ion source and ion packets are directly ejected by a pulse of electric field out of said ion guide and into a time-of-flight mass spectrometer.

22. The pulsed ion converter of claim 21 wherein said mesh electrode is a repelling RF mesh electrode wherein an ion channel is formed by said repelling RF mesh electrode with a penetrating RF field and one of: a same repelling RF mesh wrapped into a cylinder or a box of arbitrary shape; another repelling RF mesh; a DC repelling electrode; a set of electrodes forming a moving wave of electrostatic field; and an RF trapping mesh.

23. The pulsed ion converter of claim 21 wherein said ion guide comprises an array of ion guides.

24. The pulsed ion converter of claim 21 wherein said radio frequency voltage supply includes a secondary coil and is switched off either by disconnecting two parts of said secondary coil or by clamping outputs of said secondary coil by employing FTMOS transistors, said transistors being coupled by one of: (i) low capacitance diodes; and (ii) a linear RF amplifier, wherein the delay between RF signal switching and the application of electric pulses is adjusted to improve time focusing in said time-of-flight mass spectrometer.

25. The pulsed ion converter of claim 21 wherein said ion guide protrudes through multiple stages of differential pumping, wherein gas pressure varies substantially along said ion guide and wherein ion injection into the ion guide occurs at substantially higher gas pressure compared to the region of ion ejection.

26. A mass selective storage device comprising an ion guide of claim 1.

27. A method of ion manipulation for use in a mass spectrometer, the method comprising:

providing a mesh electrode having cells of a size ranging from 10 μm to 1 mm;

providing a space above the mesh electrode for transporting ions from an external ion source into the mass spectrometer;

providing a second electrode behind the mesh electrode at a distance comparable to cell size of the mesh electrode; and applying a radio frequency field substantially symmetrically around said mesh electrode for trapping ions.

28. A method of ion manipulation for use in a mass spectrometer, the method comprising:

providing a mesh electrode having cells of a size ranging from 10 μm to 1 mm;

providing a space above the mesh electrode for transporting ions from an external ion source into the mass spectrometer;

providing a second electrode behind the mesh electrode at a distance comparable to cell size of the mesh electrode; and applying an RF field penetrating through the mesh electrode to repel the ions.

29. The method of claim 28 and further comprising a step of ion collisional dampening by one of providing a continuous gas flow; providing a pulsed gas jet from a pulsed 1 nozzle; or providing a pulsed flux of desorbed vapors from a cold surface induced by pulsed particle beam.

30. The method of claim 28 and further comprising a step of applying a DC field to said mesh electrode to attract ion attraction to said mesh electrode.

31. The method of claim 28 wherein the RF field is switched off for 1 releasing the ions.

32. The method of claim 28 and further including the step of selecting the geometrical scale of said RF field to one of below 1 mm; below 0.3 mm; below 0.1 mm; below 30 lam; below 10 lam; below 3 lam; below 1 lam and wherein the RF frequency is adjusted in reverse proportion to the geometrical scale up to several GHz.

33. The method of claim 28 and further supplying a flow of gas and wherein the gas pressure range is proportional to the RF frequency and varies from 1 mtorr to atmospheric gas pressure.

34. The method of claim 28 and further including the step of inserting a dielectric into said RF field as a method of mesh support and alignment to a counter electrode.

35. The method of claim 28 and further including forming an ion channel and wherein the ion flow is guided within said ion channel, said ion channel being formed by a repelling RF field and one of: a same repelling RF field wrapped into a cylinder or a box of arbitrary shape; another repelling RF field; a DC repelling field; a moving wave of electrostatic field; and RF trapping field.

36. The method of claim 35 wherein the guidance of the ion flow within said ion channel is used for transformation of said ion flow by one of the following methods: bending; looping; arranging parallel channels for co-flows and counter-flows; confining ion flows in a smooth or stepped funnel; merging; splitting; free draining; capping; valve switching; storing in ion reservoirs; pulse damping; modulating velocity of ion flow; and pumping.

37. The method of claim 35 wherein ion flow is induced by one of the following methods by gas flow; by axial electrostatic field; by moving wave of electrostatic field; and by moving magnetic field.

38. The method of claim 28 wherein said ion manipulation is used for one of the group of: ion beam transfer; ion beam confinement; ion trapping; ion fragmentation; ion exposure to ion to particle reactions for a predetermined time; ion continuous injection into a mass spectrometer; ion pulsed injection into a mass spectrometer; and ion packet injection into the time-of-flight mass-spectrometer.

* * * * *

UNITED STATES PATENT AND TRADEMARK OFFICE

CERTIFICATE OF CORRECTION

PATENT NO. : 8,373,120 B2
APPLICATION NO. : 13/056167
DATED : February 12, 2013
INVENTOR(S) : Anatoli N. Verentchikov It is certified that error appears in the above-identified patent and that said Letters Patent is hereby corrected as shown below:

In the Claims

Column 28, line 1, Claim 1: delete the word “manipulator” and change “and” to “an”
In a mass spectrometer, ~~and~~ an ion ~~manipulator~~ guide comprising: ...

Column 30, line 11, Claim 16: delete the number “1” between mass spectrometer
An interface for transporting ions from gaseous ion sources into a mass ~~1~~ spectrometer ...

Column 30, line 29, Claim 21: change the word “a” to “the”
... ion packets are directly ejected by a pulse of electric field out of said ion guide and into ~~a~~ the time-of-flight mass spectrometer.

Column 31, line 17, Claim 29: delete the number “1” between pulsed nozzle
... providing a pulsed gas jet from a pulsed ~~1~~ nozzle; ...

Column 31, line 21, Claim 30: delete the words “ion attraction”
... a DC field to said mesh electrode to attract ~~ion attraction~~ to said mesh electrode.

Column 31, line 24, Claim 31: delete the number “1” between for releasing
... wherein the RF field is switched off for ~~1~~ releasing the ions.

Column 31, line 27, Claim 32: change “lam” to “µm”
... below 30 ~~lam~~ µm; below 10 ~~lam~~ µm; below 3 ~~lam~~ µm; below 1 ~~lam~~ µm ...

Signed and Sealed this
Twenty-fifth Day of February, 2014

Michelle K. Lee
*Deputy Director of the United States Patent and Trademark Office*